US012593045B2

(12) United States Patent
Kim et al.

(10) Patent No.: US 12,593,045 B2
(45) Date of Patent: Mar. 31, 2026

(54) ENTROPY CODING-BASED FEATURE ENCODING/DECODING METHOD AND DEVICE, RECORDING MEDIUM HAVING BITSTREAM STORED THEREIN, AND METHOD FOR TRANSMITTING BITSTREAM

(71) Applicant: LG Electronics Inc., Seoul (KR)

(72) Inventors: Chulkeun Kim, Seoul (KR); Hyeong Moon Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/703,177

(22) PCT Filed: Oct. 28, 2022

(86) PCT No.: PCT/KR2022/016656
§ 371 (c)(1),
(2) Date: Apr. 19, 2024

(87) PCT Pub. No.: WO2023/075488
PCT Pub. Date: May 4, 2023

(65) Prior Publication Data
US 2024/0414342 A1 Dec. 12, 2024

(30) Foreign Application Priority Data

| | | |
|---|---|---|
| Oct. 28, 2021 | (KR) | 10-2021-0145811 |
| Nov. 1, 2021 | (KR) | 10-2021-0148139 |
| Aug. 12, 2022 | (KR) | 10-2022-0101436 |

(51) Int. Cl.
*H04N 19/13* (2014.01)
*H04N 19/91* (2014.01)
(52) U.S. Cl.
CPC ............. *H04N 19/13* (2014.11); *H04N 19/91* (2014.11)

(58) Field of Classification Search
CPC .... G06N 20/00; H04N 19/105; H04N 19/124; H04N 19/13; H04N 19/174;
(Continued)

(56) References Cited

U.S. PATENT DOCUMENTS

| | | | | |
|---|---|---|---|---|
| 2004/0240559 A1* | 12/2004 | Prakasam | .............. | H04N 19/91 |
| | | | | 375/E7.093 |
| 2015/0341641 A1* | 11/2015 | Kolesnikov | ............ | H04N 19/70 |
| | | | | 375/240.02 |

(Continued)

FOREIGN PATENT DOCUMENTS

| | | |
|---|---|---|
| KR | 10-2040315 | 11/2019 |
| KR | 10-2020-0109904 | 9/2020 |

OTHER PUBLICATIONS

Li et al. "Deep contextual video compression." Advances in Neural Information Processing Systems 34 18114-18125—Sep. 30, 2021.*

(Continued)

*Primary Examiner* — Fabio S Lima
(74) *Attorney, Agent, or Firm* — Fish & Richardson P.C.

(57) ABSTRACT

Herein provided are a feature encoding/decoding method, a recording medium storing a bitstream generated by the feature encoding method and a method of transmitting the bitstream. The feature decoding method may comprise obtaining channel information of a current coding unit, determining a context model for the current coding unit based on the channel information; and decoding the current coding unit based on the context model. The channel information may comprise channel grouping information of a feature map including the current coding unit, and the context model is determined based on the channel grouping information.

14 Claims, 28 Drawing Sheets

(58) Field of Classification Search
CPC .... H04N 19/503; H04N 19/184; H04N 19/44;
H04N 19/625; H04N 19/70; H04N 19/91
See application file for complete search history.

(56) References Cited

U.S. PATENT DOCUMENTS

| | | | |
|---|---|---|---|
| 2019/0334956 A1* | 10/2019 | Hodgins | ............... H04L 67/306 |
| 2020/0327701 A1 | 10/2020 | Zhou et al. | |
| 2021/0203997 A1 | 7/2021 | Veselov et al. | |
| 2022/0038719 A1* | 2/2022 | Leleannec | ............ H04N 19/124 |

OTHER PUBLICATIONS

Ma et al. "A cross channel context model for latents in deep image compression." arXiv preprint arXiv:2103.02884—Mar. 4, 2021.*
Yuan et al., "Learned Image Compression with Channel-Wise Grouped Context Modeling," IEEE, Sep. 22, 2021, 6 pages.

* cited by examiner

VIDEO SOURCE(710)                                    FEATURE SET(720)

<table>
<tr><td>B channel</td><td colspan="7"></td></tr>
</table>

|  | 211 | 103 | 60 | 32 | 155 | 123 | 76 |

G channel

| 231 | 159 | 197 | 134 | 99 | 34 | 69 | 20 |

R channel

| 253 | 144 | 120 | 251 | 41 | 55 | 56 | 110 | 57 |
| 244 | 233 | 10 | 15 | 16 | 22 | 30 | 155 | 25 |
| 250 | 240 | 235 | 22 | 50 | 52 | 60 | 34 | 69 |
| 201 | 233 | 210 | 32 | 44 | 62 | 22 | 66 | 87 |
| 211 | 198 | 27 | 64 | 89 | 57 | 32 | 147 | 117 |
| 125 | 187 | 28 | 23 | 2 | 3 | 17 | 153 | |
| 133 | 176 | 19 | 17 | 11 | 0 | 16 | | |

NUMBER OF CHANNELS          3
RANGE OF VALUE          0~255
DATA TYPE          8-BIT INTEGER
<8-bit  RGB format image>

NUMBER OF CHANNELS      64
RANGE OF VALUE      $(-\infty, \infty)$
DATA TYPE     32-BIT FLOATING POINT
<64-channel feature set>

START

S1010

BINARIZATION

S1020

ENTROPY ENCODING

END

1000

Syntax element(s)

BINARIZATION UNIT
(1010)

ENTROPY ENCODING
PROCESSOR(1020)

Bitstream

ENTROPY ENCODER

START

S1110

BINARIZATION

S1120

ENTROPY DECODING

END

FIG. 12

CONTEXT DISCONTINUITY OCCURS AT BOUNDARY BETWEEN CHANNELS

FIG. 15A

| Feature_seq_parameter_set_rbsp( ) { | Descriptor |
|---|---|
| sps_entropy_coding_init_flag | u(1) |
| if(sps_entropy_coding_init_flag){ | |
| channel_entropy_coding_enable_flag | u(1) |
| } | |
| } | |

FIG. 15B

| Feature_Channel_parameter_set_rbsp( ) { | Descriptor |
|---|---|
| if(sps_entropy_coding_init_flag &&channel_entropy_coding_enable_flag) | |
| { | |
| channel_entropy_coding_init_flag | u(1) |
| } | |
| } | |

FIG. 16

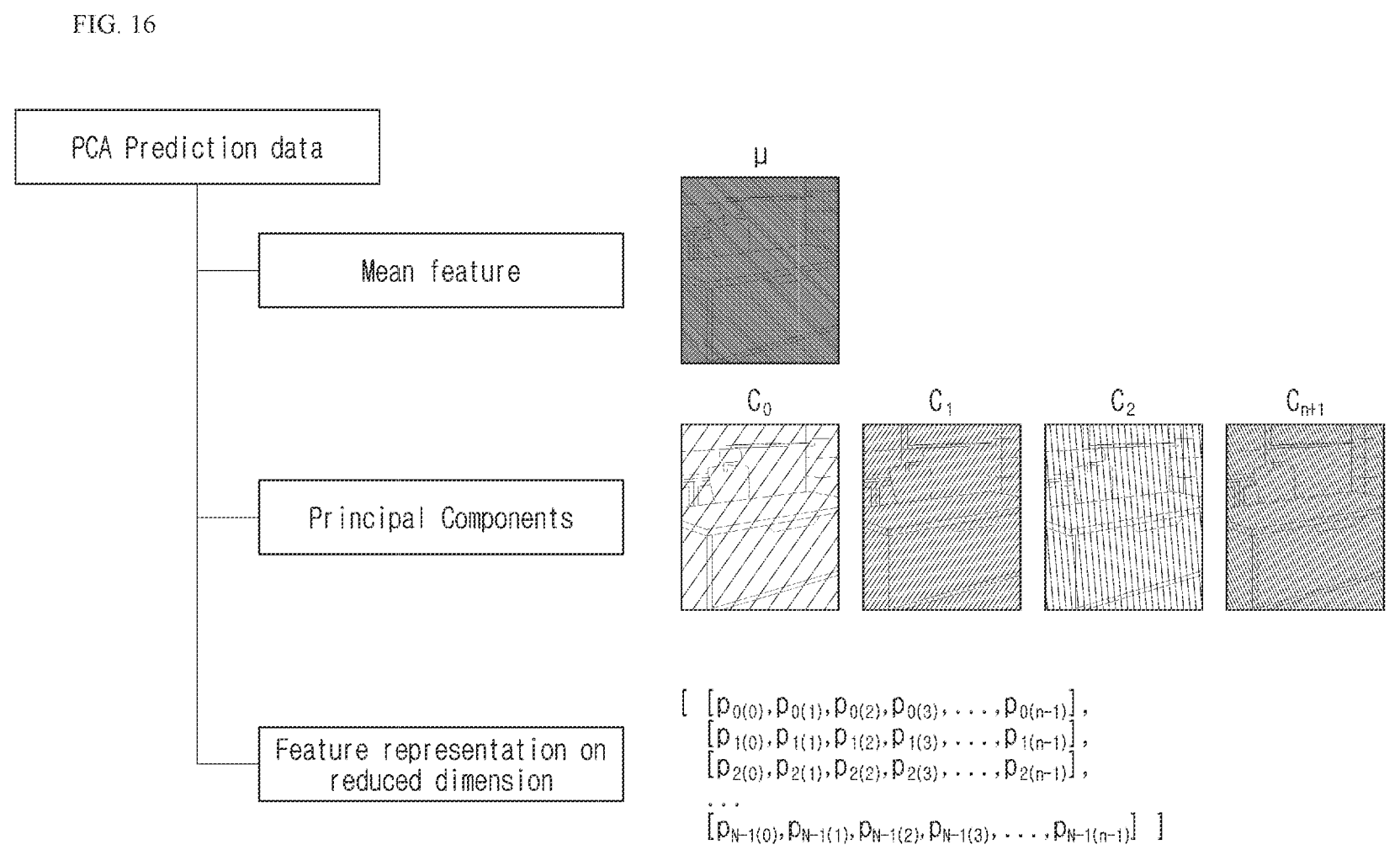

PCA Prediction data

Mean feature

Principal Components

Feature representation on reduced dimension $\mu$ $C_0$    $C_1$    $C_2$    $C_{n+1}$ $[ \ [p_{0(0)}, p_{0(1)}, p_{0(2)}, p_{0(3)}, \ldots, p_{0(n-1)}],$
$[p_{1(0)}, p_{1(1)}, p_{1(2)}, p_{1(3)}, \ldots, p_{1(n-1)}],$
$[p_{2(0)}, p_{2(1)}, p_{2(2)}, p_{2(3)}, \ldots, p_{2(n-1)}],$
$\ldots$
$[p_{N-1(0)}, p_{N-1(1)}, p_{N-1(2)}, p_{N-1(3)}, \ldots, p_{N-1(n-1)}] \ ]$

GROUP 0 : CH0, CH6, CH9
GROUP 1 : CH1, CH7, CH8
GROUP 2 : CH2~CH5, CH10, CH11

| Feature_seq_parameter_set_rbsp( ) { | Descriptor |
|---|---|
| channel_entropy_coding_sync_flag | u(1) |
| } | |

FIG. 20
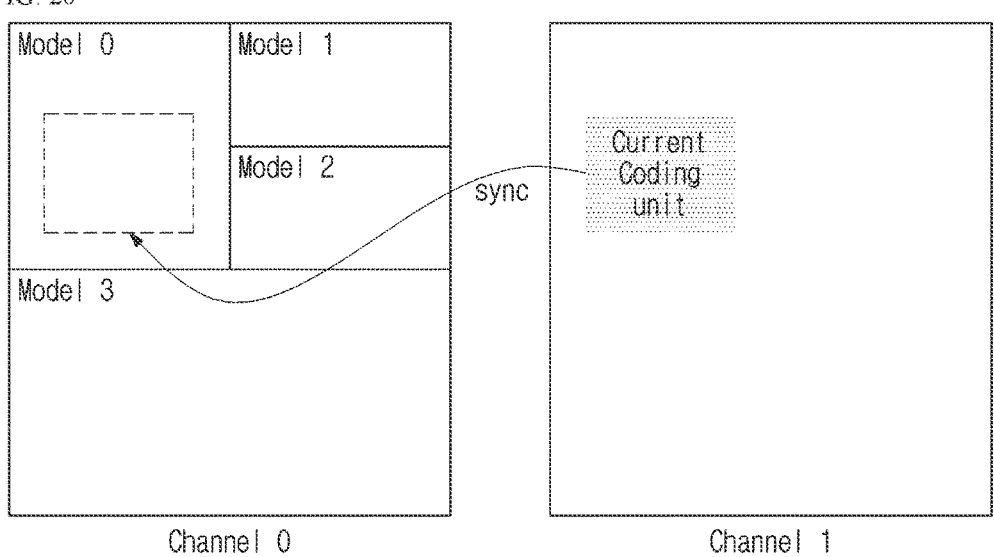
FIG. 21
| Feature_seq_parameter_set_rbsp( ) { | Descriptor |
|---|---|
| channel_entropy_coding_collocated_sync_flag | u(1) |
| multiple_context_enable_flag | u(1) |
| if(multiple_context_enable_flag){ | |
| num_context_model_minus1 | u(4) |
| } | |
| } | |
FIG. 22
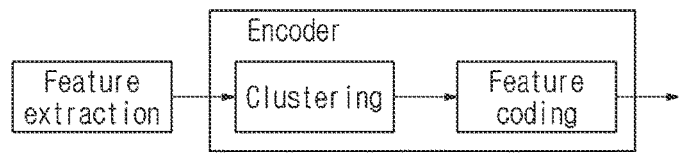
FIG. 23
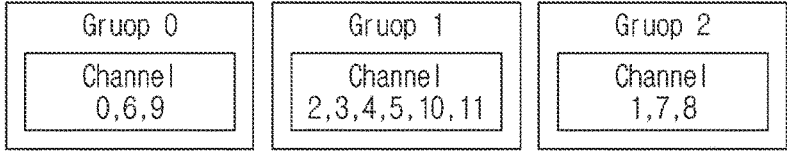

FIG. 24A

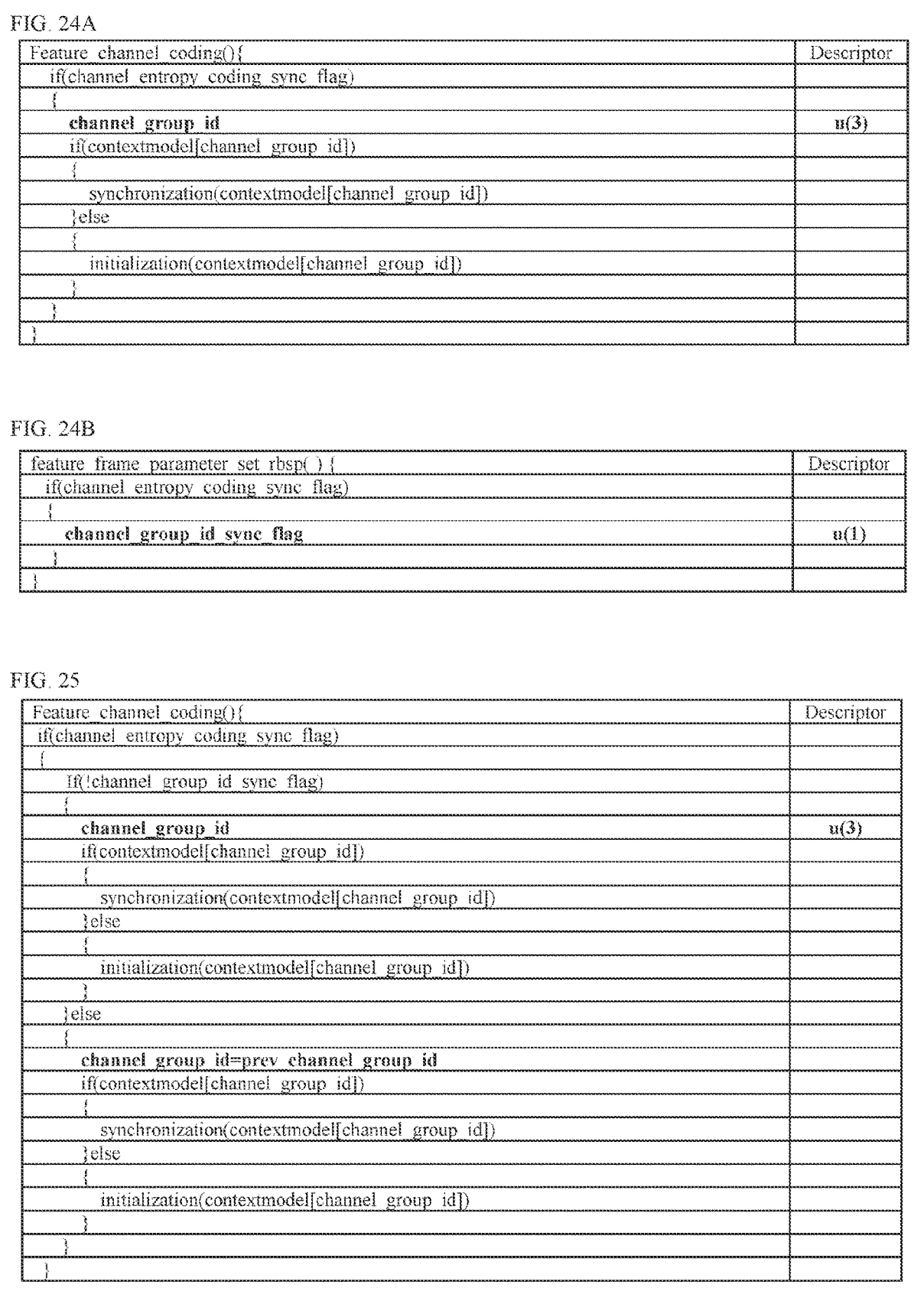

| Feature channel coding(){ | Descriptor |
|---|---|
| if(channel entropy coding sync flag) | |
| { | |
| channel_group_id | u(3) |
| if(contextmodel[channel_group_id]) | |
| { | |
| synchronization(contextmodel[channel_group_id]) | |
| }else | |
| { | |
| initialization(contextmodel[channel_group_id]) | |
| } | |
| } | |
| } | |

FIG. 24B

| feature_frame_parameter_set_rbsp( ) { | Descriptor |
|---|---|
| if(channel entropy coding sync flag) | |
| { | |
| channel_group_id_sync_flag | u(1) |
| } | |
| } | |

FIG. 25

| Feature channel coding(){ | Descriptor |
|---|---|
| if(channel entropy coding sync flag) | |
| { | |
| If(!channel_group_id_sync_flag) | |
| { | |
| channel_group_id | u(3) |
| if(contextmodel[channel_group_id]) | |
| { | |
| synchronization(contextmodel[channel_group_id]) | |
| }else | |
| { | |
| initialization(contextmodel[channel_group_id]) | |
| } | |
| }else | |
| { | |
| channel_group_id=prev_channel_group_id | |
| if(contextmodel[channel_group_id]) | |
| { | |
| synchronization(contextmodel[channel_group_id]) | |
| }else | |
| { | |
| initialization(contextmodel[channel_group_id]) | |
| } | |
| } | |
| } | |

FIG. 26A

| Feature_seq_parameter_set_rbsp( ) { | Descriptor |
|---|---|
| channel_entropy_coding_sync_flag | u(1) |
| if(channel_entropy_coding_sync_flag) | |
| { | |
| frame_group_id_enable_flag | u(1) |
| if(frame_group_id_enable_flag) | |
| for( i = 0; i <= num_channel_minus1; i++ ){ | |
| channel_group_ids[i] | ue(v) |
| } | |
| } | |
| } | |

FIG. 26B

| Feature_channel_coding(){ | Descriptor |
|---|---|
| if(channel_entropy_coding_sync_flag) | |
| { | |
| if(!channel_group_id_sync_flag) | |
| { | |
| if(frame_group_id_enable_flag){ | |
| channel_group_id = channel_group_ids[current_channel] | |
| }else | |
| { | |
| channel_group_id | u(3) |
| } | |
| if(contextmodel[channel_group_id]) | |
| { | |
| synchronization(contextmodel[channel_group_id]) | |
| }else | |
| { | |
| initialization(contextmodel[channel_group_id]) | |
| } | |
| }else | |
| { | |
| if(frame_group_id_enable_flag){ | |
| channel_group_id = prev_channel_group_ids[current_channel] | |
| }else | |
| channel_group_id=prev_channel_group_id | |
| } | |
| if(contextmodel[channel_group_id]) | |
| { | |
| synchronization(contextmodel[channel_group_id]) | |
| }else | |
| { | |
| initialization(contextmodel[channel_group_id]) | |
| } | |
| } | |
| } | |

| Feature_seq_parameter_set_rbsp( ) { | Descriptor |
|---|---|
| channel_constrained_intra_pred_flag | u(1) |
| } | |

| Feature_seq_parameter_set_rbsp( ) { | Descriptor |
|---|---|
| channel_constrained_inter_pred_flag | u(1) |
| } | |

☐ CURRENT CHANNEL

▨ ENCODING/DECODING AREA OF CURRENT CHANNEL

▨ OTHER CHANNEL

☐ CURRENT CHANNEL

☐ ENCODING/DECODING AREA OF CURRENT CHANNEL

▨ OTHER CHANNEL

| Feature_seq_parameter_set_rbsp( ) { | Descriptor |
|---|---|
| channel_independent_pred_flag | u(1) |
| } | |

| Channel_parameter_set_rbsp( ) { | Descriptor |
|---|---|
| channel_independent_pred_flag | u(1) |
| } | |

| Feature_Coding_Unit( ) { | Descriptor |
|---|---|
|   channel_independent_pred_flag | u(1) |
| } | |

ENTROPY CODING-BASED FEATURE ENCODING/DECODING METHOD AND DEVICE, RECORDING MEDIUM HAVING BITSTREAM STORED THEREIN, AND METHOD FOR TRANSMITTING BITSTREAM

CROSS-REFERENCE TO RELATED APPLICATIONS

This application is a National Stage application under 35 U.S.C. § 371 of International Application No. PCT/KR2022/016656, filed on Oct. 28, 2022, which claims the benefit of Korean Patent Application No. 10-2021-0145811, filed on Oct. 28, 2021, Korean Patent Application No. 10-2021-0148139, filed on Nov. 1, 2021, and Korean Patent Application No. 10-2022-0101436, filed on Aug. 12, 2022. The disclosures of the prior applications are incorporated by reference herein in their entirety.

TECHNICAL FIELD

The present disclosure relates to a feature encoding/decoding method and apparatus, and more specifically, to a feature encoding/decoding method and apparatus based on entropy coding, a recording medium storing a bitstream generated by the feature encoding method/apparatus of the present disclosure and a method of transmitting a bitstream.

BACKGROUND ART

With the development of machine learning technology, demand for image processing-based artificial intelligence services is increasing. In order to effectively process a vast amount of image data required for artificial intelligence services within limited resources, image compression technology optimized for machine task performance is essential. However, existing image compression technology has been developed with the goal of high-resolution, high-quality image processing for human vision, and has the problem of being unsuitable for artificial intelligence services. Accordingly, research and development on new machine-oriented image compression technology suitable for artificial intelligence services is actively underway.

DISCLOSURE

Technical Problem

An object of the present disclosure is to provide a feature encoding/decoding method and apparatus with improved encoding/decoding efficiency.

Additionally, the present disclosure is to provide a feature encoding/decoding method and apparatus based on entropy coding.

Additionally, the present disclosure is to provide a feature encoding/decoding method and apparatus based on inter-channel context model synchronization.

Additionally, the present disclosure is to provide a feature encoding/decoding method and apparatus based on a multi-context model.

Additionally, the present disclosure is to provide a feature encoding/decoding method and apparatus based on constrained reference information for intra prediction or inter prediction.

Another object of the present disclosure is to provide a method of transmitting a bitstream generated by a feature encoding method or apparatus.

Another object of the present disclosure is to provide a recording medium storing a bitstream generated by a feature encoding method or apparatus according to the present disclosure.

Another object of the present disclosure is to provide a recording medium storing a bitstream received, decoded and used to reconstruct a feature by a feature decoding apparatus according to the present disclosure.

The technical problems solved by the present disclosure are not limited to the above technical problems and other technical problems which are not described herein will become apparent to those skilled in the art from the following description.

Technical Solution

A feature decoding method according to an aspect of the present disclosure may comprise obtaining channel information of a current coding unit, determining a context model for the current coding unit based on the channel information, and decoding the current coding unit based on the context model. The channel information may comprise channel grouping information of a feature map including the current coding unit, and the context model may be determined based on the channel grouping information.

A feature decoding apparatus according to another aspect of the present disclosure may comprise a memory and at least one processor. The at least one processor may obtain channel information of a current coding unit, determine a context model for the current coding unit based on the channel information, and decode the current coding unit based on the context model. The channel information may comprise channel grouping information of a feature map including the current coding unit, and the context model may be determined based on the channel grouping information.

A feature encoding method according to another aspect of the present disclosure may comprise determining channel information of a current coding unit, determining a context model for the current coding unit based on the channel information, and encoding the current coding unit based on the context model. The channel information may comprise channel grouping information of a feature map including the current coding unit, and the context model may be determined based on the channel grouping information.

A feature encoding apparatus according to another aspect of the present disclosure may comprise a memory and at least one processor. The at least one processor may determine channel information of a current coding unit, determine a context model for the current coding unit based on the channel information, and encode the current coding unit based on the context model. The channel information may comprise channel grouping information of a feature map including the current coding unit, and the context model may be determined based on the channel grouping information.

In addition, a recording medium according to another aspect of the present disclosure may store a bitstream generated by the feature encoding method or the feature encoding apparatus of the present disclosure.

In addition, a transmission method according to another aspect of the present disclosure may transmit a bitstream generated by the feature encoding method or the feature encoding apparatus of the present disclosure to a feature decoding apparatus.

The features briefly summarized above with respect to the present disclosure are merely exemplary aspects of the detailed description below of the present disclosure, and do not limit the scope of the present disclosure.

Advantageous Effects

According to the present disclosure, it is possible to provide a feature encoding/decoding method and apparatus with improved encoding/decoding efficiency.

Also, according to the present disclosure, it is possible to provide an image encoding/decoding method and apparatus based on entropy coding.

Also, according to the present disclosure, it is possible to provide an image encoding/decoding method and apparatus based on inter-channel context model synchronization.

Also, according to the present disclosure, it is possible to provide an image encoding/decoding method and apparatus based on a multi-context model.

Also, according to the present disclosure, it is possible to provide an image encoding/decoding method and apparatus based on constrained reference information for intra prediction or inter prediction.

Also, according to the present disclosure, it is possible to provide a method of transmitting a bitstream generated by a feature encoding method or apparatus according to the present disclosure.

Also, according to the present disclosure, it is possible to provide a recording medium storing a bitstream generated by a feature encoding method or apparatus according to the present disclosure.

Also, according to the present disclosure, it is possible to provide a recording medium storing a bitstream received, decoded and used to reconstruct a feature by a feature decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 6 is a flowchart schematically illustrating a feature/feature map decoding procedure to which embodiments of the present disclosure are applicable.

FIG. 12 is a diagram showing a feature encoding apparatus and a feature decoding apparatus.

FIGS. 15a and 15b are diagrams showing syntaxes for entropy coding initialization according to an embodiment of the present disclosure.

FIG. 16 is a diagram illustrating examples of channels to which an entropy coding initialization method according to an embodiment of the present disclosure is applicable.

FIG. 20 is a diagram for explaining a multi-context model application and synchronization method according to an embodiment of the present disclosure.

FIG. 21 is a diagram illustrating syntax for application and synchronization of a multi-context model according to an embodiment of the present disclosure.

FIG. 22 is a diagram showing an encoder structure for performing channel clustering.

FIG. 23 is a diagram showing an example of channel grouping.

FIG. 24a is a diagram illustrating feature channel coding syntax according to an embodiment of the present disclosure.

FIG. 24b is a diagram showing a feature frame parameter set according to an embodiment of the present disclosure.

FIG. 25 is a diagram showing feature channel coding syntax according to an embodiment of the present disclosure.

FIG. 26a is a diagram showing a feature sequence parameter set according to an embodiment of the present disclosure.

FIG. 26b is a diagram illustrating feature channel coding syntax according to an embodiment of the present disclosure.

MODE FOR INVENTION

Figure 1:
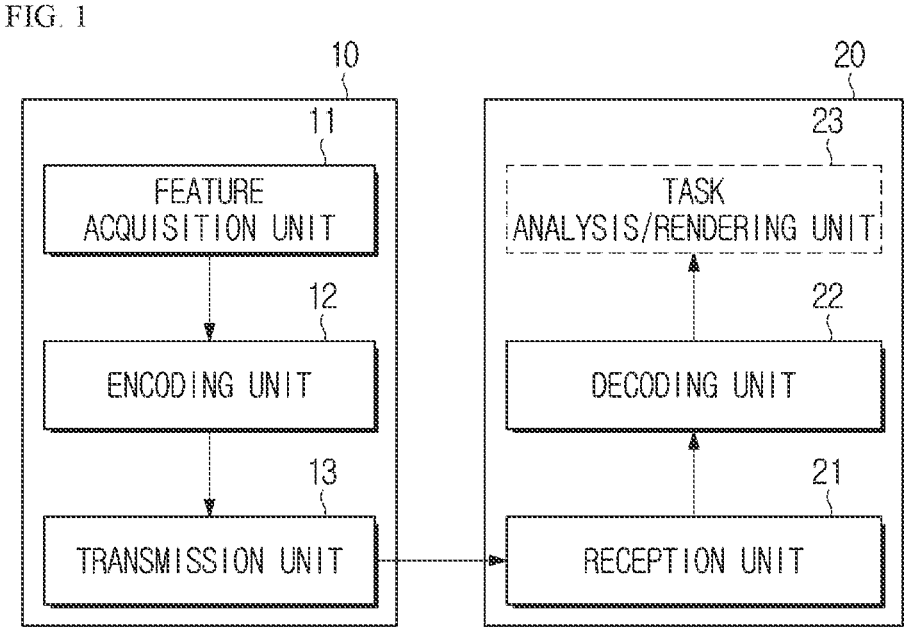
FIG. 1 is a view schematically showing a VCM system to which embodiments of the present disclosure are applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, in case it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected". "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

The present disclosure may be applied to a method disclosed in a Versatile Video Coding (VVC) standard and/or a Video Coding for Machines (VCM) standard. In addition, the present disclosure may be applied to a method disclosed in an essential video coding (EVC) standard, AOMedia Video 1 (AV1) standard, 2nd generation of audio video coding standard (AVS2), or a next-generation video/image coding standard (e.g., H.267 or H.268, etc.).

This disclosure provides various embodiments related to video/image coding, and, unless otherwise stated, the embodiments may be performed in combination with each other. In the present disclosure, "video" refers to a set of a series of images according to the passage of time. An "image" may be information generated by artificial intelligence (AI). Input information used in the process of performing a series of tasks by AI, information generated during the information processing process, and the output information may be used as images. In the present disclosure, a "picture" generally refers to a unit representing one image in a specific time period, and a slice/tile is a coding unit constituting a part of a picture in encoding. One picture may be composed of one or more slices/tiles. In addition, a slice/tile may include one or more coding tree units (CTUs). The CTU may be partitioned into one or more CUs. A tile is a rectangular region present in a specific tile row and a specific tile column in a picture, and may be composed of a plurality of CTUs. A tile column may be defined as a rectangular region of CTUs, may have the same height as a picture, and may have a width specified by a syntax element signaled from a bitstream part such as a picture parameter set. A tile row may be defined as a rectangular region of CTUs, may have the same width as a picture, and may have a height specified by a syntax element signaled from a bitstream part such as a picture parameter set. A tile scan is a certain continuous ordering method of CTUs partitioning a picture. Here, CTUs may be sequentially ordered according to a CTU raster scan within a tile, and tiles in a picture may be sequentially ordered according to a raster scan order of tiles of the picture. A slice may contain an integer number of complete tiles, or may contain a continuous integer number of complete CTU rows within one tile of one picture. A slice may be exclusively included in a single NAL unit. One picture may be composed of one or more tile groups. One tile group may include one or more tiles. A brick may indicate a rectangular region of CTU rows within a tile in a picture. One tile may include one or more bricks. The brick may refer to a rectangular region of CTU rows in a tile. One tile may be split into a plurality of bricks, and each brick may include one or more CTU rows belonging to a tile. A tile which is not split into a plurality of bricks may also be treated as a brick.

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In an embodiment, especially when applied to VCM, when there is a picture composed of a set of components having different characteristics and meanings, a pixel/pixel value may represent a pixel/pixel value of a component generated through independent information or combination, synthesis, and analysis of each component. For example, in RGB input, only the pixel/pixel value of R may be represented, only the pixel/pixel value of G may be represented, or only the pixel/pixel value of B may be represented. For example, only the pixel/pixel value of a luma component synthesized using the R, G. and B components may be represented. For example, only the pixel/pixel values of images and information extracted through analysis of R, G, and B components from components may be represented.

In the present disclosure, a "unit" may represent a basic unit of image processing. The unit may include at least one of a specific region of the picture and information related to the region. One unit may include one luma block and two chroma (e.g., Cb and Cr) blocks. The unit may be used interchangeably with terms such as "sample array", "block" or "area" in some cases. In a general case, an M×N block may include samples (or sample arrays) or a set (or array) of transform coefficients of M columns and N rows. In an embodiment, in particular, especially when applied to VCM, the unit may represent a basic unit containing information for performing a specific task.

In the present disclosure, "current block" may mean one of "current coding block". "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

The present disclosure relates to video/image coding for machines (VCM).

VCM refers to a compression technology that encodes/decodes part of a source image/video or information obtained from the source image/video for the purpose of machine vision. In VCM, the encoding/decoding target may be referred to as a feature. The feature may refer to information extracted from the source image/video based on task purpose, requirements, surrounding environment, etc. The feature may have a different information form from the source image/video, and accordingly, the compression method and expression format of the feature may also be different from those of the video source.

VCM may be applied to a variety of application fields. For example, in a surveillance system that recognizes and tracks objects or people, VCM may be used to store or transmit object recognition information. In addition, in intelligent transportation or smart traffic systems. VCM may be used to transmit vehicle location information collected from GPS, sensing information collected from LIDAR, radar, etc., and various vehicle control information to other vehicles or infrastructure. Additionally, in the smart city field, VCM may be used to perform individual tasks of interconnected sensor nodes or devices.

The present disclosure provides various embodiments of feature/feature map coding. Unless otherwise specified, embodiments of the present disclosure may be implemented individually, or may be implemented in combination of two or more.

Overview of VCM System

FIG. 1 is a diagram schematically showing a VCM system to which embodiments of the present disclosure are applicable.

Referring to FIG. 1, the VCM system may include an encoding apparatus 10 and a decoding apparatus 20.

The encoding apparatus 10 may compress/encode a feature/feature map extracted from a source image/video to generate a bitstream, and transmit the generated bitstream to the decoding apparatus 20 through a storage medium or network. The encoding apparatus 10 may also be referred to as a feature encoding apparatus. In a VCM system, the feature/feature map may be generated at each hidden layer of a neural network. The size and number of channels of the generated feature map may vary depending on the type of neural network or the location of the hidden layer. In the present disclosure, a feature map may be referred to as a feature set.

The encoding apparatus 10 may include a feature acquisition unit 11, an encoding unit 12, and a transmission unit 13.

The feature acquisition unit 11 may acquire a feature/feature map for the source image/video. Depending on the embodiment, the feature acquisition unit 11 may acquire a feature/feature map from an external device, for example, a feature extraction network. In this case, the feature acquisition unit 11 performs a feature reception interface function. Alternatively, the feature acquisition unit 11 may acquire a feature/feature map by executing a neural network (e.g., CNN, DNN, etc.) using the source image/video as input. In this case, the feature acquisition unit 11 performs a feature extraction network function.

Depending on the embodiment, the encoding apparatus 10 may further include a source image generator (not shown) for acquiring the source image/video. The source image generator may be implemented with an image sensor, a camera module, etc., and may acquire the source image/video through an image/video capture, synthesis, or generation process. In this case, the generated source image/video may be sent to the feature extraction network and used as input data for extracting the feature/feature map.

The encoding unit 12 may encode the feature/feature map acquired by the feature acquisition unit 11. The encoding unit 12 may perform a series of procedures such as prediction, transform, and quantization to increase encoding efficiency. The encoded data (encoded feature/feature map information) may be output in the form of a bitstream. The bitstream containing the encoded feature/feature map information may be referred to as a VCM bitstream.

The transmission unit 13 may send feature/feature map information or data output in the form of a bitstream to the decoding apparatus 20 through a digital storage medium or network in the form of a file or streaming. Here, digital storage media may include various storage media such as USB, SD. CD, DVD, Blu-ray, HDD, and SSD. The transmission unit 13 may include elements for generating a media file with a predetermined file format or elements for transmitting data through a broadcasting/communication network.

The decoding apparatus 20 may acquire feature/feature map information from the encoding apparatus 10 and reconstruct the feature/feature map based on the acquired information.

The decoding apparatus 20 may include a reception unit 21 and a decoding unit 22.

The reception unit 21 may receive a bitstream from the encoding apparatus 10, acquire feature/feature map information from the received bitstream, and send it to the decoding unit 22.

The decoding unit 22 may decode the feature/feature map based on the acquired feature/feature map information. The decoding unit 22 may perform a series of procedures such as dequantization, inverse transform, and prediction corresponding to the operation of the encoding unit 14 to increase decoding efficiency.

Depending on the embodiment, the decoding apparatus 20 may further include a task analysis/rendering unit 23.

The task analysis/rendering unit 23 may perform task analysis based on the decoded feature/feature map. Additionally, the task analysis/rendering unit 23 may render the decoded feature/feature map into a form suitable for task performance. Various machine (oriented) tasks may be performed based on task analysis results and the rendered features/feature map.

As described above, the VCM system may encode/decode the feature extracted from the source image/video according to user and/or machine requests, task purpose, and surrounding environment, and performs various machine (oriented) tasks based on the decoded feature. The VCM system may be implemented by expanding/redesigning the video/image coding system and may perform various encoding/decoding methods defined in the VCM standard.

VCM Pipeline

Figure 2:
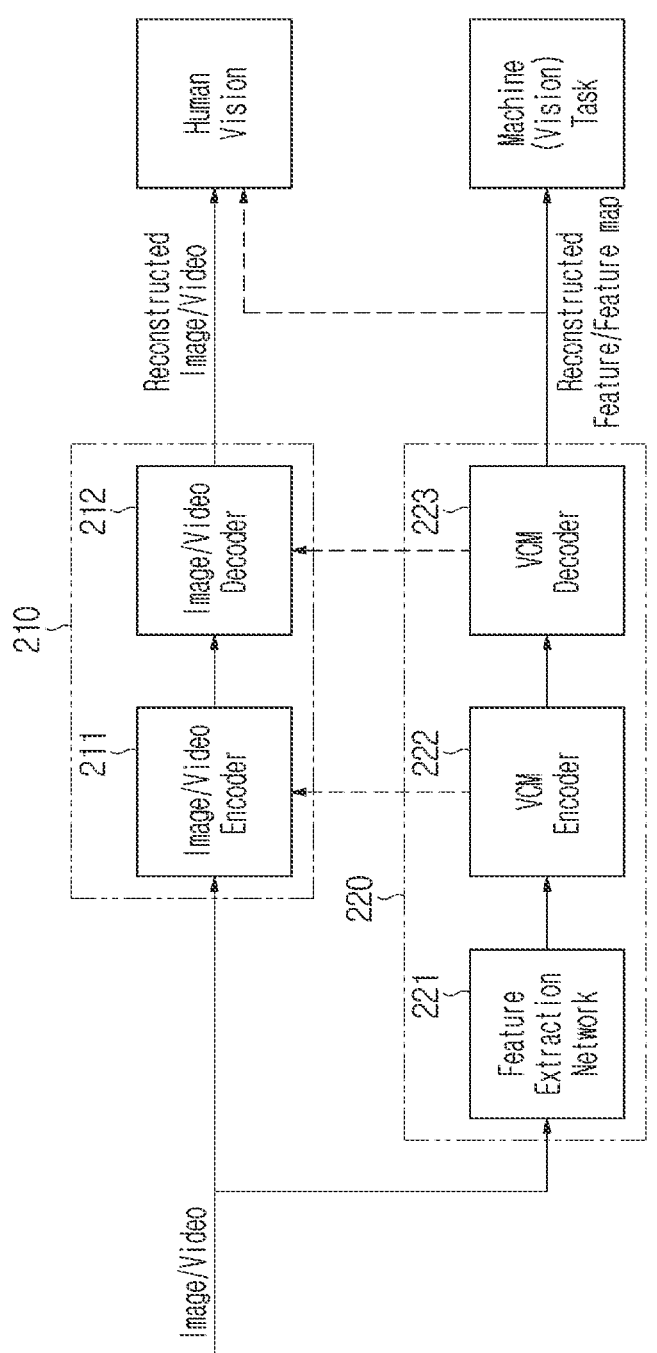
FIG. 2 is a diagram schematically showing a VCM pipeline structure to which embodiments of the present disclosure are applicable.

FIG. 2 is a diagram schematically showing a VCM pipeline structure to which embodiments of the present disclosure are applicable.

Referring to FIG. 2, the VCM pipeline 200 may include a first pipeline 210 for encoding/decoding an image/video and a second pipeline 220 for encoding/decoding a feature/feature map. In the present disclosure, the first pipeline 210 may be referred to as a video codec pipeline, and the second pipeline 220 may be referred to as a feature codec pipeline.

The first pipeline 210 may include a first stage 211 for encoding an input image/video and a second stage 212 for decoding the encoded image/video to generate a reconstructed image/video. The reconstructed image/video may be used for human viewing, that is, human vision.

The second pipeline 220 may include a third stage 221 for extracting a feature/feature map from the input image/video, a fourth stage 222 for encoding the extracted feature/feature map, and a fifth stage 223 for decoding the encoded feature/feature map to generate a reconstructed feature/feature map. The reconstructed feature/feature map may be used for a machine (vision) task. Here, the machine (vision) task may refer to a task in which images/videos are consumed by a machine. The machine (vision) task may be applied to service scenarios such as, for example. Surveillance, Intelligent Transportation, Smart City, Intelligent Industry. Intelligent Content, etc. Depending on the embodiment, the reconstructed feature/feature map may be used for human vision.

Depending on the embodiment, the feature/feature map encoded in the fourth stage 222 may be transferred to the first stage 221 and used to encode the image/video. In this case, an additional bitstream may be generated based on the encoded feature/feature map, and the generated additional bitstream may be transferred to the second stage 222 and used to decode the image/video.

Depending on the embodiment, the feature/feature map decoded in the fifth stage 223 may be transferred to the second stage 222 and used to decode the image/video.

FIG. 2 shows a case where the VCM pipeline 200 includes a first pipeline 210 and a second pipeline 220, but this is merely an example and embodiments of the present disclosure are not limited thereto. For example, the VCM pipeline 200 may include only the second pipeline 220, or the second pipeline 220 may be expanded into multiple feature codec pipelines.

Meanwhile, in the first pipeline 210, the first stage 211 may be performed by an image/video encoder, and the second stage 212 may be performed by an image/video decoder. Additionally, in the second pipeline 220, the third stage 221 may be performed by a VCM encoder (or feature/feature map encoder), and the fourth stage 222 may be performed by a VCM decoder (or feature/feature map encoder). Hereinafter, the encoder/decoder structure will be described in detail.

Encoder

Figure 3:
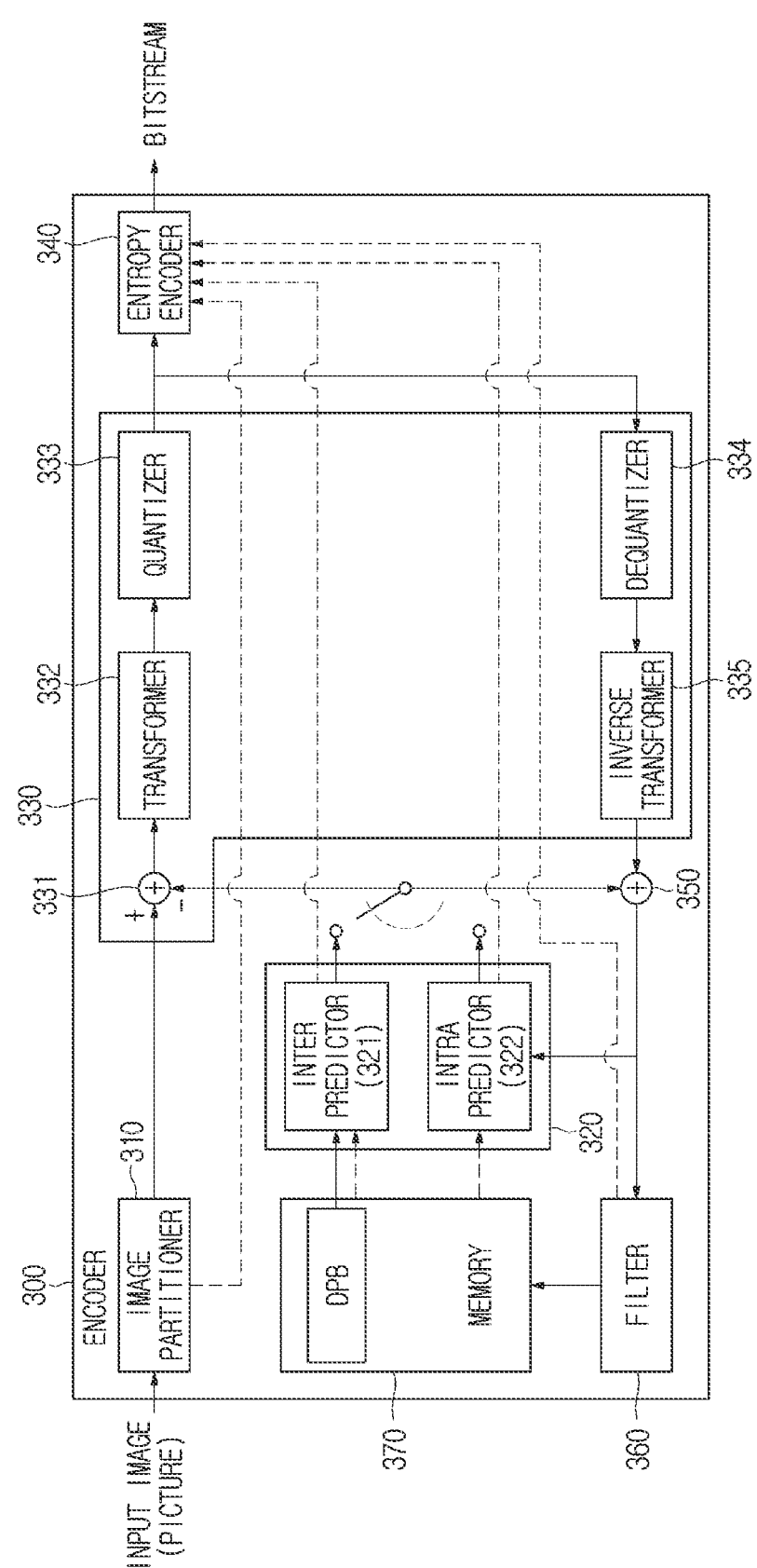
FIG. 3 is a diagram schematically showing an image/video encoder to which embodiments of the present disclosure are applicable.

FIG. 3 is a diagram schematically showing an image/video encoder to which embodiments of the present disclosure are applicable.

Referring to FIG. 3, the image/video encoder 300 may further include an image partitioner 310, a predictor 320, a residual processor 330, an entropy encoder 340, and an adder 350, a filter 360, and a memory 370. The predictor 320 may include an inter predictor 321 and an intra predictor 322. The residual processor 330 may include a transformer 332, a quantizer 333, a dequantizer 334, and an inverse transformer 335. The residual processor 330 may further include a subtractor 331. The adder 350 may be referred to as a reconstructor or a reconstructed block generator. The image partitioner 310, the predictor 320, the residual processor 330, the entropy encoder 340, the adder 350, and the filter 360 may be configured by one or more hardware components (e.g., encoder chipset or processor) depending on the embodiment. Additionally, the memory 370 may include a decoded picture buffer (DPB) and may be configured by a digital storage medium. The hardware components described above may further include a memory 370 as an internal/external component.

The image partitioner 310 may partition an input image (or picture, frame) input to the image/video encoder 300 into one or more processing units. As an example, the processing unit may be referred to as a coding unit (CU). The coding unit may be recursively partitioned according to a quad-tree binary-tree ternary-tree (QTBTTT) structure from a coding tree unit (CTU) or largest coding unit (LCU). For example, one coding unit may be partitioned into a plurality of coding units of deeper depth based on a quad tree structure, binary tree structure, and/or ternary structure. In this case, for example, the quad tree structure may be applied first and the binary tree structure and/or ternary structure may be applied later. Alternatively, the binary tree structure may be applied first. The image/video coding procedure according to the present disclosure may be performed based on a final coding unit that is no longer partitioned. In this case, the largest coding unit may be used as the final coding unit based on coding efficiency according to image characteristics, or, if necessary, the coding unit may be recursively partitioned into coding units of deeper depth to use a coding unit with an optimal size as the final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may each be divided or partitioned from the final coding unit described above. The prediction unit may be a unit of sample prediction, and the transform unit may be a unit for deriving a transform coefficient and/or a unit for deriving a residual signal from the transform coefficient.

In some cases, the unit may be used interchangeably with terms such as block or area. In a general case, an M×N block may represent a set of samples or transform coefficients consisting of M columns and N rows. A sample may generally represent a pixel or a pixel value, and may represent only a pixel/pixel value of a luma component, or only a pixel/pixel value of a chroma component. The sample may be used as a term corresponding to pixel or pel.

The image/video encoder 300 may generate a residual signal (residual block, residual sample array) by subtracting a prediction signal (predicted block, prediction sample array) output from the inter predictor 321 or the intra predictor 322 from the input image signal (original block, original sample array) and transmit the generated residual signal to the transformer 332. In this case, as shown, the unit that subtracts the prediction signal (prediction block, prediction sample array) from the input image signal (original block, original sample array) within the image/video encoder 300 may be referred to as the subtractor 331. The predictor may perform prediction on a processing target block (hereinafter referred to as a current block) and generate a predicted block including prediction samples for the current block. The predictor may determine whether intra prediction or inter prediction is applied in current block or CU units. The predictor may generate various information related to prediction, such as prediction mode information, and transfer it to the entropy encoder 340. Information about prediction may be encoded in the entropy encoder 340 and output in the form of a bitstream.

The intra predictor 322 may predict the current block by referring to the samples in the current picture. At this time, the referenced samples may be located in the neighbor of the current block or may be located away from the current block, depending on the prediction mode. In intra prediction, the prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on settings. The intra predictor 322 may determine the prediction mode applied to the current block by using a prediction mode applied to a neighboring block.

The inter predictor 321 may derive a predicted block for the current block based on a reference block (reference sample array) specified by a motion vector on a reference picture. In this case, in order to reduce the amount of motion information transmitted in the inter prediction mode, the motion information may be predicted in block, subblock, or sample units based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 321 may construct a motion information candidate list based on neighboring blocks and generate information indicating which candidate is used to derive a motion vector and/or reference picture index of the current block. Inter prediction may be performed based on various prediction modes, and, for example, in the case of a skip mode and a merge mode, the inter predictor 321 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and a motion vector difference may be signaled to indicate the motion vector of the current block.

The predictor 320 may generate a prediction signal based on various prediction methods. For example, the predictor may not only apply intra prediction or inter prediction but also simultaneously apply both intra prediction and inter prediction, for prediction of one block. This may be called combined inter and intra prediction (CIIP). In addition, the predictor may be based on an intra block copy (IBC) prediction mode or a palette mode for prediction of the block. The IBC prediction mode or the palette mode may be used for content image/video coding of a game or the like, for example, screen content coding (SCC). IBC basically performs prediction within the current picture, but may be performed similarly to inter prediction in that a reference block is derived within the current picture. That is, IBC may use at least one of the inter prediction techniques described in the present disclosure. The palette mode may be regarded as an example of intra coding or intra prediction. When the palette mode is applied, the sample values within the picture may be signaled based on information about a palette table and a palette index.

The prediction signal generated by the predictor 320 may be used to generate a reconstructed signal or to generate a residual signal. The transformer 332 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT refers to transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to non-square blocks having a variable size.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may reorder quantized transform coefficients in a block form into a one-dimensional vector form based on a coefficient scan order and generate information on the quantized transform coefficients based on the quantized transform coefficients in the one-dimensional vector form. The entropy encoder 340 may perform various encoding methods such as, for example, exponential Golomb, context-adaptive variable length coding (CAVLC), context-adaptive binary arithmetic coding (CABAC), and the like. The entropy encoder 340 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In addition, the video/image information may further include a method of generating and using encoded information, a purpose, and the like. In the present disclosure, information and/or syntax elements transferred/signaled from the image/video encoder to the image/video decoder may be included in image/video information. The image/video information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 340 and/or a storage unit (not shown) storing the signal may be configured as internal/external element of the image/video encoder 300, or the transmitter may be included in the entropy encoder 340.

The quantized transform coefficients output from the quantizer 130 may be used to generate a prediction signal. For example, the residual signal (residual block or residual samples) may be reconstructed by applying dequantization and inverse transform to the quantized transform coefficients through the dequantizer 334 and the inverse transformer 335. The adder 350 adds the reconstructed residual signal to the prediction signal output from the inter predictor 321 or the intra predictor 322 to generate a reconstructed signal (reconstructed picture, reconstructed block, reconstructed sample array). In a case where there is no residual for the processing target block, such as a case where the skip mode is applied, the predicted block may be used as the reconstructed block. The adder 350 may be called a reconstructor or a reconstructed block generator. The generated reconstructed signal may be used for intra prediction of a next processing target block in the current picture and may be used for inter prediction of a next picture through filtering as described below.

Meanwhile, luma mapping with chroma scaling (LMCS) is applicable in a picture encoding and/or reconstruction process.

The filter 360 may improve subjective/objective image quality by applying filtering to the reconstructed signal. For example, the filter 360 may generate a modified reconstructed picture by applying various filtering methods to the reconstructed picture, and store the modified reconstructed picture in the memory 370, specifically, a DPB of the memory 370. The various filtering methods may include, for example, deblocking filtering, a sample adaptive offset, an adaptive loop filter, a bilateral filter, and the like. The filter

360 may generate various information related to filtering and transmit the generated information to the entropy encoder 190. The information related to filtering may be encoded by the entropy encoder 340 and output in the form of a bitstream.

The modified reconstructed picture transmitted to the memory 370 may be used as the reference picture in the inter predictor 321. Through this, prediction mismatch between the encoder and the decoder may be avoided and encoding efficiency may be improved.

The DPB of the memory 370 may store the modified reconstructed picture for use as a reference picture in the inter predictor 321. The memory 370 may store the motion information of the block from which the motion information in the current picture is derived (or encoded) and/or the motion information of the blocks in the already reconstructed picture. The stored motion information may be transferred to the inter predictor 321 for use as the motion information of the spatial neighboring block or the motion information of the temporal neighboring block. The memory 370 may store reconstructed samples of reconstructed blocks in the current picture and may transfer the stored reconstructed samples to the intra predictor 322.

Meanwhile, the VCM encoder (or feature/feature map encoder) basically performs a series of procedures such as prediction, transform, and quantization to encode the feature/feature map and thus may basically have the same/similar structure as the image/video encoder 300 described with reference to FIG. 3. However, the VCM encoder is different from the image/video encoder 300 in that the feature/feature map is an encoding target, and thus may be different from the image/video encoder 300 in the name of each unit (or component) (e.g., image partitioner 310, etc.) and its specific operation content. The specific operation of the VCM encoder will be described in detail later.

Decoder

Figure 4:
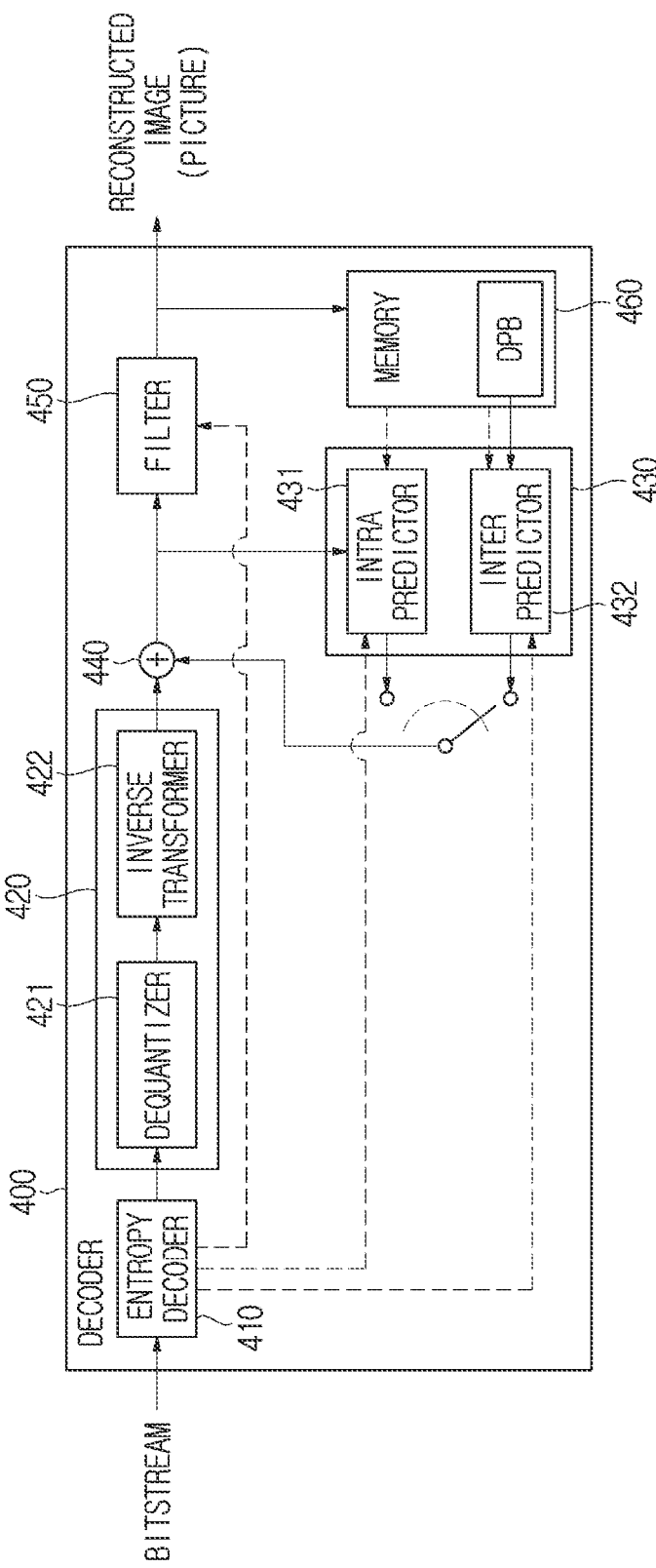
FIG. 4 is a diagram schematically showing an image/video decoder to which embodiments of the present disclosure are applicable.

FIG. 4 is a diagram schematically showing an image/video decoder to which embodiments of the present disclosure are applicable.

Referring to FIG. 4, the image/video decoder 400 may include an entropy decoder 410, a residual processor 420, a predictor 430, an adder 440, a filter 450 and a memory 460. The predictor 430 may include an inter predictor 431 and an intra predictor 432. The residual processor 420 may include a dequantizer 421 and an inverse transformer 422. The entropy decoder 410, the residual processor 420, the predictor 430, the adder 440, and the filter 450 may be configured by one hardware component (e.g., a decoder chipset or processor) depending on the embodiment. Additionally, the memory 460 may include a decoded picture buffer (DPB) and may be configured by a digital storage medium. The hardware component may further include the memory 460 as an internal/external component.

When a bitstream containing video/image information is input, the image/video decoder 400 may reconstruct an image/video in correspondence with the process in which the image/video information is processed in the image/video encoder 3M) of FIG. 3. For example, the image/video decoder 400 may derive units/blocks based on block partition-related information acquired from the bitstream. The image/video decoder 400 may perform decoding using a processing unit applied in the image/video encoder. Accordingly, the processing unit of decoding may, for example, be a coding unit, and the coding unit may be partitioned from a coding tree unit or a largest coding unit according to a quad tree structure, a binary tree structure and/or a ternary tree structure. One or more transform units may be derived from the coding unit. In addition, the reconstructed image signal decoded and output through the image/video decoder 400 may be played through a playback device.

The image/video decoder 400 may receive a signal output from the encoder of FIG. 3 in the form of a bitstream, and decode the received signal through the entropy decoder 410. For example, the entropy decoder 410 may parse the bitstream to derive information (e.g., image/video information) necessary for image reconstruction (or picture reconstruction). The image/video information may further include information about various parameter sets, such as an adaptation parameter set (APS), picture parameter set (PPS), sequence parameter set (SPS), or video parameter set (VPS). Additionally, image/video information may further include general constraint information. Additionally, the image/video information may include a method of generating and using decoded information, a purpose, and the like. The image/video decoder 400 may decode the picture further based on information about the parameter set and/or general constraint information. The signaled/received information and/or syntax elements may be decoded and acquired from the bitstream through a decoding procedure. For example, the entropy decoder 410 may decode information in the bitstream based on a coding method such as exponential Golomb coding, CAVLC, or CABAC, and output the values of syntax elements necessary for image reconstruction and quantized values of transform coefficients related to residuals. More specifically, in the CABAC entropy decoding method, a bin corresponding to each syntax element may be received in the bitstream, a context model may be determined using decoding target syntax element information and decoding information of neighboring and decoding target blocks or information on the symbol/bin decoded in the previous step, the occurrence probability of the bin may be predicted according to the determined context model, and arithmetic decoding of the bin may be performed to generate a symbol corresponding to the value of each syntax element. At this time, the CABAC entropy decoding method may update the context model using the information on the decoded symbol/bin for the context model of the next symbol/bin after determining the context model. Information about prediction among the information decoded in the entropy decoder 410 is provided to the predictor (inter predictor 432 and intra predictor 431), and a residual value obtained by performing entropy decoding in the entropy decoder 410, that is, quantized transform coefficients and related parameter information may be input to the residual processor 420. The residual processor 420 may derive a residual signal (residual block, residual samples, residual sample array). Additionally, information about filtering among the information decoded by the entropy decoder 410 may be provided to the filter 450. Meanwhile, a receiver (not shown) that receives a signal output from the image/video encoder may be further configured as an internal/external element of the image/video decoder 400, or the receiver may be a component of the entropy decoder 410. Meanwhile, the image/video decoder according to the present disclosure may be called an image/video decoding apparatus, and the image/video decoder may be divided into an information decoder (image/video information decoder) and a sample decoder (image/video sample decoder). In this case, the information decoder may include an entropy decoder 410, and the sample decoder may include at least one of a dequantizer 321, an inverse transformer 322, an adder 440, a filter 450, and a memory 460, an inter predictor 432 or an intra predictor 431.

The dequantizer 421 may dequantize the quantized transform coefficients and output transform coefficients. The dequantizer 421 may rearrange the quantized transform coefficients into a two-dimensional block form. In this case, rearranging may be performed based on the coefficient scan order performed in the image/video encoder. The dequantizer 321 may perform dequantization on quantized transform coefficients using quantization parameters (e.g., quantization step size information) and acquire transform coefficients.

The inverse transformer 422 inversely transforms the transform coefficients to acquire a residual signal (residual block, residual sample array).

The predictor 430 may perform prediction on the current block and generate a predicted block including prediction samples for the current block. The predictor may determine whether intra prediction or inter prediction is applied to the current block based on information about prediction output from the entropy decoder 410, and may determine a specific intra/inter prediction mode.

The predictor 420 may generate a prediction signal based on various prediction methods. For example, the predictor may not only apply intra prediction or inter prediction for prediction of one block, but also may apply intra prediction and inter prediction simultaneously. This may be called combined inter and intra prediction (CIIP). Additionally, the predictor may be based on an intra block copy (IBC) prediction mode or a palette mode for prediction of a block. The IBC prediction mode or palette mode may be used, for example, for image/video coding of content such as games, such as screen content coding (SCC). In IBC, prediction is basically performed within the current picture, but may be performed similarly to inter prediction in that a reference block is derived within the current picture. That is, IBC may use at least one of the inter prediction techniques described in this document. The palette mode may be viewed as an example of intra coding or intra prediction. When the palette mode is applied, information about the palette table and palette index may be included and signaled in the image/video information.

The intra predictor 431 may predict the current block by referencing samples in the current picture. The referenced samples may be located in the neighbor of the current block, or may be located away from the current block, depending on the prediction mode. In intra prediction, prediction modes may include a plurality of non-directional modes and a plurality of directional modes. The intra predictor 431 may determine the prediction mode applied to the current block using the prediction mode applied to the neighboring block.

The inter predictor 432 may derive a predicted block for the current block based on a reference block (reference sample array) specified by a motion vector in the reference picture. At this time, in order to reduce the amount of motion information transmitted in the inter prediction mode, motion information may be predicted in block, subblock, or sample units based on the correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, neighboring blocks may include a spatial neighboring block present in the current picture and a temporal neighboring block present in the reference picture. For example, the inter predictor 432 may construct a motion information candidate list based on neighboring blocks and derive a motion vector and/or reference picture index of the current block based on received candidate selection information. Inter prediction may be performed based on various prediction modes, and information about prediction may include information indicating the mode of inter prediction for the current block.

The adder 440 may generate a reconstructed signal (reconstructed picture, reconstructed block, reconstructed sample array) by adding the acquired residual signal to a prediction signal (predicted block, prediction sample array) output from the predictor (including the inter predictor 432 and/or the intra predictor 431). If there is no residual for a processing target block, such as when skip mode is applied, the predicted block may be used as a reconstruction block.

The adder 440 may be called a reconstructor or a reconstruction block generator. The generated reconstructed signal may be used for intra prediction of a next processing target block in the current picture, may be output after filtering as described later, or may be used for inter prediction of a next picture.

Meanwhile, luma mapping with chroma scaling (LMCS) is applicable in a picture decoding process.

The filter 450 can improve subjective/objective image quality by applying filtering to the reconstructed signal. For example, the filter 450 may generate a modified reconstructed picture by applying various filtering methods to the reconstructed picture, and transmit the modified reconstructed picture in the memory 460, specifically the DPB of the memory 460. Various filtering methods may include, for example, deblocking filtering, sample adaptive offset, adaptive loop filter, bilateral filter, etc.

The (modified) reconstructed picture stored in the DPB of the memory 460 may be used as a reference picture in the inter predictor 432. The memory 460 may store motion information of a block from which motion information in the current picture is derived (or decoded) and/or motion information of blocks in an already reconstructed picture. The stored motion information may be transferred to the inter predictor 432 for use as motion information of spatial neighboring blocks or motion information of temporal neighboring blocks. The memory 460 may store reconstructed samples of reconstructed blocks in the current picture and transfer them to the intra predictor 431.

Meanwhile, the VCM decoder (or feature/feature map decoder) performs a series of procedures such as prediction, inverse transform, and dequantization to decode the feature/feature map, and may basically have the same/similar structure as the image/video decoder 400 described above with reference to FIG. 4. However, the VCM decoder is different from the image/video decoder 400 in that the feature/feature map is a decoding target, and may be different from the image/video decoder 400 in the name (e.g., DPB, etc.) of each unit (or component) and its specific operation. The operation of the VCM decoder may correspond to the operation of the VCM encoder, and the specific operation will be described in detail later.

Feature/Feature Map Encoding Procedure

Figure 5:
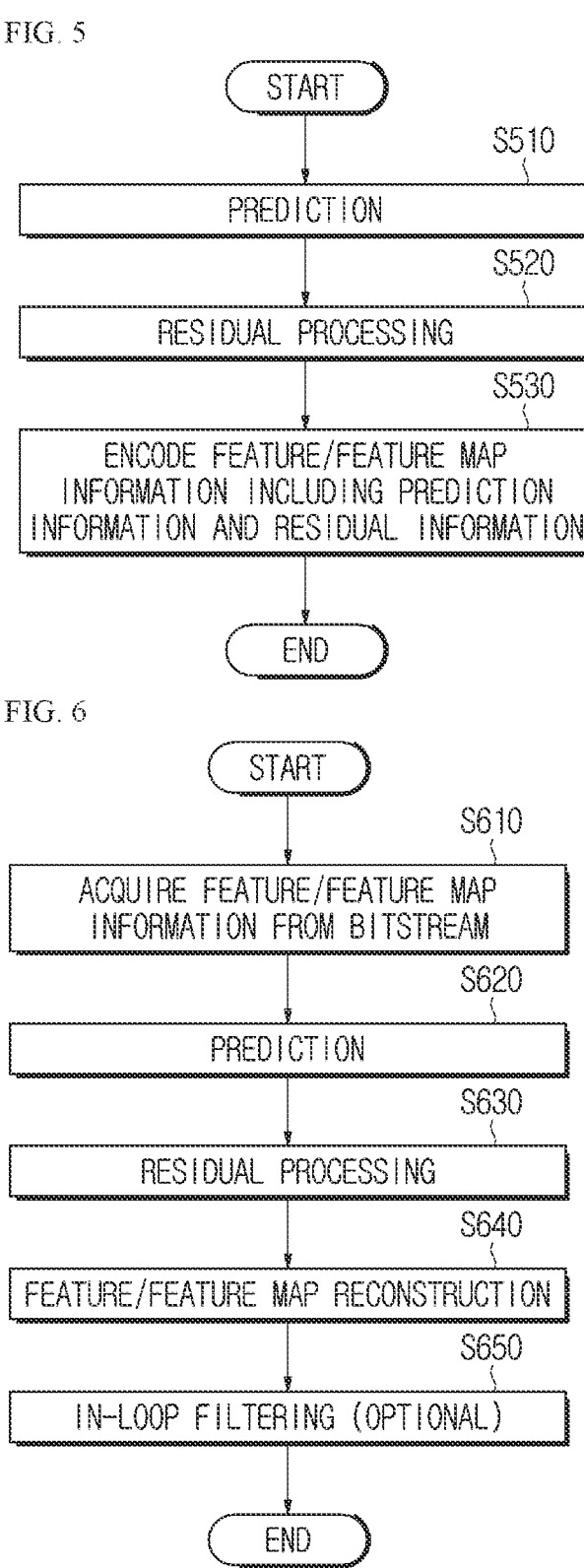
FIG. 5 is a flowchart schematically illustrating a feature/feature map encoding procedure to which embodiments of the present disclosure are applicable.

FIG. 5 is a flowchart schematically illustrating a feature/feature map encoding procedure to which embodiments of the present disclosure are applicable.

Referring to FIG. 5, the feature/feature map encoding procedure may include a prediction procedure (S510), a residual processing procedure (S520), and an information encoding procedure (S530).

The prediction procedure (S510) may be performed by the predictor 320 described above with reference to FIG. 3.

Specifically, the intra predictor 322 may predict a current block (that is, a set of current encoding target feature elements) by referencing feature elements in a current feature/feature map. Intra prediction may be performed based on the spatial similarity of feature elements constituting the feature/feature map. For example, feature elements included in the same region of interest (RoI) within an image/video may be estimated to have similar data distribution characteristics. Accordingly, the intra predictor 322 may predict the current block by referencing the already reconstructed feature elements within the region of interest including the current block. At this time, the referenced feature elements may be located adjacent to the current block or may be located away from the current block depending on the prediction mode. Intra prediction modes for feature/feature map encoding may include a plurality of non-directional prediction modes and a plurality of directional prediction modes. The non-directional prediction modes may include, for example, prediction modes corresponding to the DC mode and planar mode of the image/video encoding procedure. Additionally, the directional modes may include prediction modes corresponding to, for example, 33 directional modes or 65 directional modes of an image/video encoding procedure. However, this is an example, and the type and number of intra prediction modes may be set/changed in various ways depending on the embodiment.

The inter predictor 321 may predict the current block based on a reference block (i.e., a set of referenced feature elements) specified by motion information on the reference feature/feature map. Inter prediction may be performed based on the temporal similarity of feature elements constituting the feature/feature map. For example, temporally consecutive features may have similar data distribution characteristics. Accordingly, the inter predictor 321 may predict the current block by referencing the already reconstructed feature elements of features temporally adjacent to the current feature. At this time, motion information for specifying the referenced feature elements may include a motion vector and a reference feature/feature map index. The motion information may further include information about an inter prediction direction (e.g., L0 prediction, L1 prediction. Bi prediction, etc.). In the case of inter prediction, neighboring blocks may include spatial neighboring blocks present within the current feature/feature map and temporal neighboring blocks present within the reference feature/feature map. A reference feature/feature map including a reference block and a reference feature/feature map including a temporal neighboring block may be the same or different. The temporal neighboring block may be referred to as a collocated reference block, etc., and a reference feature/feature map including a temporal neighboring block may be referred to as a collocated feature/feature map. The inter predictor 321 may construct a motion information candidate list based on neighboring blocks and generate information indicating which candidate is used to derive the motion vector and/or reference feature/feature map index of the current block. Inter prediction may be performed based on various prediction modes. For example, in the case of the skip mode and the merge mode, the inter predictor 321 may use motion information of the neighboring block as motion information of the current block. In the case of the skip mode, unlike the merge mode, the residual signal may not be transmitted. In the case of the motion vector prediction (MVP) mode, the motion vector of the neighboring block is used as a motion vector predictor, and the motion vector of the current block may be indicated by signaling the motion vector difference. The predictor 320 may generate a prediction signal based on various prediction methods in addition to intra prediction and inter prediction described above.

The prediction signal generated by the predictor 320 may be used to generate a residual signal (residual block, residual feature elements) (S520). The residual processing procedure (S520) may be performed by the residual processor 330 described above with reference to FIG. 3. In addition, (quantized) transform coefficients may be generated through a transform and/or quantization procedure for the residual signal, and the entropy encoder 340 may encode information about the (quantized) transform coefficients in the bitstream as residual information (S530). Additionally, the entropy encoder 340 may encode information necessary for feature/feature map reconstruction, such as prediction information (e.g., prediction mode information, motion information, etc.), in the bitstream, in addition to the residual information.

Meanwhile, the feature/feature map encoding procedure may further include not only a procedure (S530) for encoding information for feature/feature map reconstruction (e.g., prediction information, residual information, partitioning information, etc.) and outputting it in the form of a bitstream, a procedure for generating a reconstructed feature/feature map for the current feature/feature map and a procedure (optional) for applying in-loop filtering to the reconstructed feature/feature map.

The VCM encoder may derive (modified) residual feature(s) from the quantized transform coefficient(s) through dequantization and inverse transform, and generate a reconstructed feature/feature map based on the predicted feature(s) and (modified) residual feature(s) that are the output of step S510. The reconstructed feature/feature map generated in this way may be the same as the reconstructed feature/feature map generated in the VCM decoder. When an in-loop filtering procedure is performed on the reconstructed feature/feature map, a modified reconstructed feature/feature map may be generated through the in-loop filtering procedure on the reconstructed feature/feature map. The modified reconstructed feature/feature map may be stored in a decoded feature buffer (DFB) or memory and used as a reference feature/feature map in the feature/feature map prediction procedure later. Additionally. (in-loop) filtering-related information (parameters) may be encoded and output in the form of a bitstream. Through the in-loop filtering procedure, noise that may occur during feature/feature map coding may be removed, and feature/feature map-based task performance may be improved. In addition, by performing an in-loop filtering procedure at both the encoder stage and the decoder stage, the identity of the prediction result can be guaranteed, the reliability of feature/feature map coding can be improved, and the amount of data transmission for feature/feature map coding can be reduced.

Feature/Feature Map Decodine Procedure

FIG. 6 is a flowchart schematically illustrating a feature/feature map decoding procedure to which embodiments of the present disclosure are applicable.

Referring to FIG. 6, the feature/feature map decoding procedure may include an image/video information acquisition procedure (S610), a feature/feature map reconstruction procedure (S620 to S640), and an in-loop filtering procedure for a reconstructed feature/feature map (S650). The feature/feature map reconstruction procedure may be performed on the prediction signal and residual signal acquired through inter/intra prediction (S620) and residual processing (S630), dequantization and inverse transform process for quantized transform coefficients described in the present disclosure. A modified reconstructed feature/feature map may be generated through an in-loop filtering procedure for the reconstructed feature/feature map, and the modified reconstructed feature/feature map may be output as a decoded feature/feature map. The decoded feature/feature map may be stored in a decoded feature buffer (DFB) or memory and used as a reference feature/feature map in the inter prediction procedure when decoding the feature/feature map. In some cases, the above-described in-loop filtering procedure may be omitted. In this case, the reconstructed feature/feature map may be output without change as a decoded feature/feature map, and stored in the decoded feature buffer (DFB) or memory, and then be used as a reference feature/feature map in the inter prediction procedure when decoding the feature/feature map.

Feature Extraction Method and Data Distribution Characteristics

Figures 7, 8A:
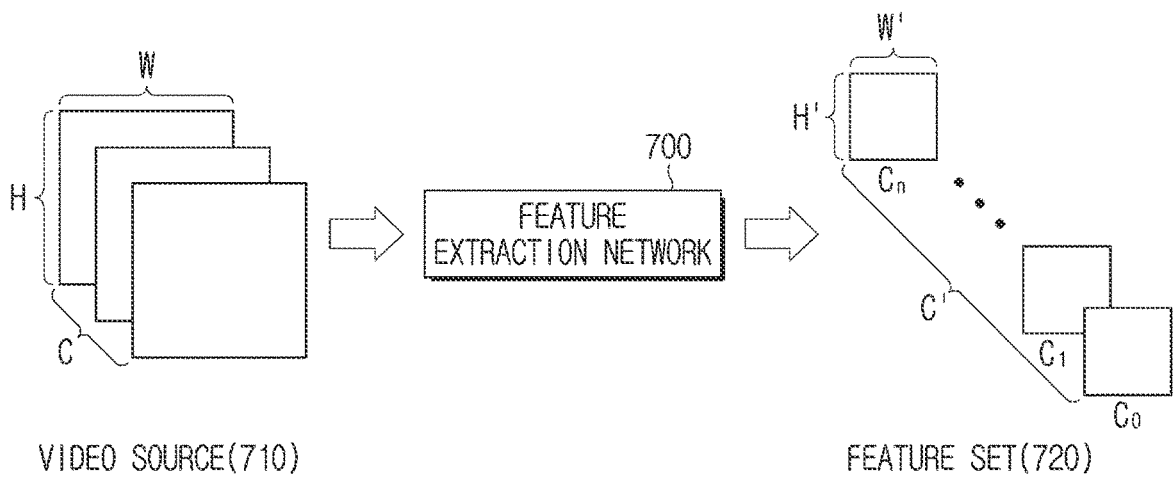
FIG. 7 is a diagram illustrating an example of a feature extraction method using a feature extraction network.
FIG. 8a is a diagram showing data distribution characteristics of a video source.

FIG. 7 is a diagram illustrating an example of a feature extraction method using a feature extraction network.

Referring to FIG. 7, the feature extraction network 700 may receive a video source 710 and perform a feature extraction operation to output a feature set 720 of the video source 710. The feature set 720 may include a plurality of features $C_0, C_1, \ldots, C_n$ extracted from the video source 710, and may be expressed as a feature map. Each feature $C_0, C_1, \ldots, C_n$ includes a plurality of feature elements and may have different data distribution characteristics.

In FIG. 7, W, H, and C may mean the width, height, and number of channels of the video source 710, respectively. Here, the number C of channels of the video source 710 may be determined based on the image format of the video source 710. For example, when the video source 710 has an RGB image format, the number C of channels of the video source 710 may be 3.

Additionally, W', H', and C' may mean the width, height, and number of channels of the feature set 720, respectively. The number C' of channels of the feature set 720 may be equal to the total number (n+1) of features $C_0, C_1, \ldots, C_n$ extracted from the video source 710. In one example, the number C' of channels of the feature set 720 may be greater than the number C of channels of the video source 710.

The properties W', H', C' of the feature set 720 may vary depending on the properties W, H, C of the video source 710. For example, as the number C of channels of the video source 710 increases, the number C' of channels of the feature set 720 may also increase. Additionally, the properties W', H', C' of the feature set 720 may vary depending on the type and properties of the feature extraction network 700. For example, if the feature extraction network 700 is implemented as an artificial neural network (e.g., CNN, DNN, etc.), the properties W', H', C' of the feature set 720 may also vary according to the location of the layer outputting each feature $C_0, C_1, \ldots, C_n$.

The video source 710 and the feature set 720 may have different data distribution characteristics. For example, the video source 710 may generally consist of one (grayscale image) channel or three (RGB image) channels. Pixels included in the video source 710 may have the same integer value range for all channels and may have non-negative values. Additionally, each pixel value may be evenly distributed within a predetermined integer value range. On the other hand, the feature set 720 may be composed of a various number of channels (e.g., 32, 64, 128, 256, 512, etc.) depending on the type of feature extraction network 700 (e.g., CNN, DNN, etc.) and layer location. Feature elements included in the feature set 720 may have different real value ranges for each channel and may also have negative values.

Additionally, each feature element value may be intensively distributed in a specific area within a predetermined real value range.

Figure 8B:
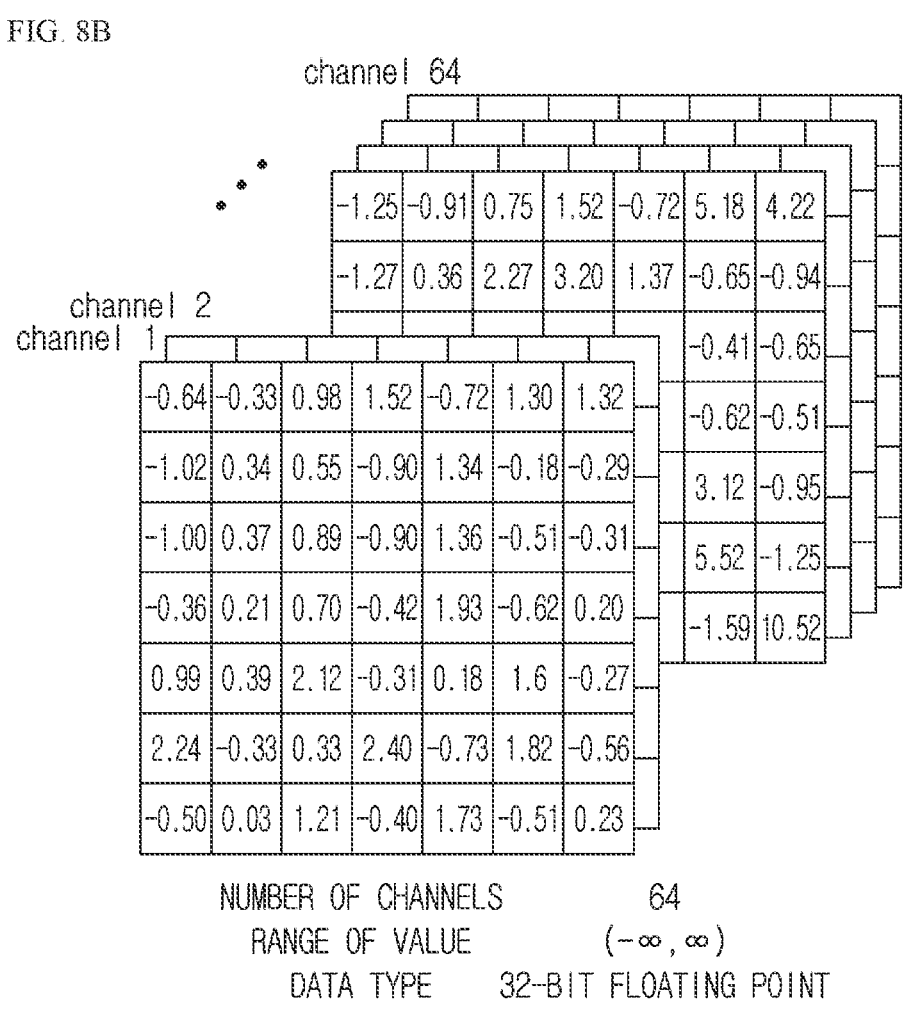
FIG. 8b is a diagram showing data distribution characteristics of a feature set.

FIG. 8a is a diagram showing the data distribution characteristics of a video source, and FIG. 8b is a diagram showing the data distribution characteristics of a feature set.

First, referring to FIG. 8a, the video source consists of a total of three channels, R, G, and B, and each pixel value may have an integer value range from 0 to 255. In this case, the data type of the video source may be expressed as an 8-bit integer type.

In contrast, referring to FIG. 8b, the feature set consists of 64 channels (features), and each feature element value may have a real value range from $-\infty$ to $+\infty$. In this case, the data type of the feature set may be expressed as a 32-bit floating point type.

A feature set may have feature element values of floating point type, and may have different data distribution characteristics for each channel (or feature). An example of data distribution characteristics for each channel of the feature set is shown in Table 1.

TABLE 1

| Channel | Average($\mu$) | Standard derivation($\sigma$) | Max | Min |
|---|---|---|---|---|
| $C_0$ | 10 | 20 | 90 | 60 |
| $C_1$ | 30 | 10 | 70.5 | −70.2 |
| | | . . . | | |
| $C_n$ | 100 | 5 | 115.8 | 80.2 |

Referring to Table 1, the feature set may consist of a total of n+1 channels $C_0$, $C_1$, . . . , $C_n$. The average value $\mu$, standard deviation $\sigma$, maximum value Max, and minimum value Min of the feature elements may be different for each channel $C_0$, $C_1$, . . . , $C_n$. For example, the average value $\mu$ of the feature elements included in channel 0 $C_0$ may be 10, the standard deviation $\sigma$ may be 20, the maximum value Max may be 90, and the minimum value Min may be 60. Additionally, the average value $\mu$ of the feature elements included in channel 1 $C_1$ may be 30, the standard deviation $\sigma$ may be 10, the maximum value Max may be 70.5, and the minimum value Min may be −70.2. Additionally, the average value $\mu$ of the feature elements included in the n-th channel $C_n$ may be 100, the standard deviation $\sigma$ may be 5, the maximum value Max may be 115.8, and the minimum value Min may be 80.2.

Quantization of the feature/feature map may be performed, for example, based on different data distribution characteristics for each channel described above. Feature/feature map data of floating point type may be transformed into integer type through quantization.

Meanwhile, due to spatiotemporal similarity between consecutive frames, feature sets and/or channels consecutively extracted from a video source may have the same/similar data distribution characteristics. An example of the data distribution characteristics of consecutive feature sets is shown in Table 2.

TABLE 2

| Feture set | Average($\mu$) | Standard derivation($\sigma$) | Max | Min |
|---|---|---|---|---|
| $f_{F0}$ | 50 | 10 | 110.5 | 10.7 |
| $f_{F1}$ | 52 | 11 | 120.5 | 11.5 |
| $f_{Fn}$ | 53 | 10 | 115 | 5 |

In Table 2, $f_{F0}$ means a first feature set extracted from Frame 0(F0), $f_{F1}$ means a second feature set extracted from frame 1 (F1), and $f_{F2}$ means a third feature set extracted from Frame 2 (F2).

Referring to Table 2, the consecutive first to third feature sets $f_{F0}$, $f_{F1}$ and $f_{F2}$ have the same/similar average value $\mu$, standard deviation $\sigma$, maximum value Max and minimum value Min.

Also, due to the spatiotemporal similarity between consecutive frames, corresponding channels in feature sets consecutively extracted from a video source may have the same/similar data distribution characteristics. An example of the data distribution characteristics of corresponding channels of the consecutive feature sets is as shown in Table 3.

TABLE 3

| Feture set | Average($\mu$) | Standard derivation($\sigma$) | Max | Min |
|---|---|---|---|---|
| $f_{F0C0}$ | 40 | 10 | 110.5 | 10.7 |
| $f_{F1C0}$ | 40 | 11 | 111.5 | 11.5 |

In Table 3, $f_{F0C0}$ means a first channel in a first feature set extracted from Frame 0(F0), and $f_{F1C0}$ means a first channel in a second feature set extracted from Frame 1 (F1).

Referring to Table 3, the first channel $f_{F0C0}$ in the first feature set and the second channel $f_{F1C0}$ in the second feature set corresponding thereto have the same/similar average value $\mu$, standard deviation $\sigma$, maximum value Max, and minimum value Min.

Prediction of the feature/feature map may be performed, for example, based on the similarity of data distribution characteristics between the above-described feature sets or channels.

Entropy Coding

All or some of feature/feature map information may be entropy-encoded by an entropy encoder, and all or some of the feature/feature map information may be entropy-decoded by an entropy decoder. In this case, the feature/feature map information may be encoded/decoded in units of a syntax element like the image/video information. In the present disclosure, encoding/decoding of information may include encoding/decoding by the method described in this paragraph.

Figure 9:
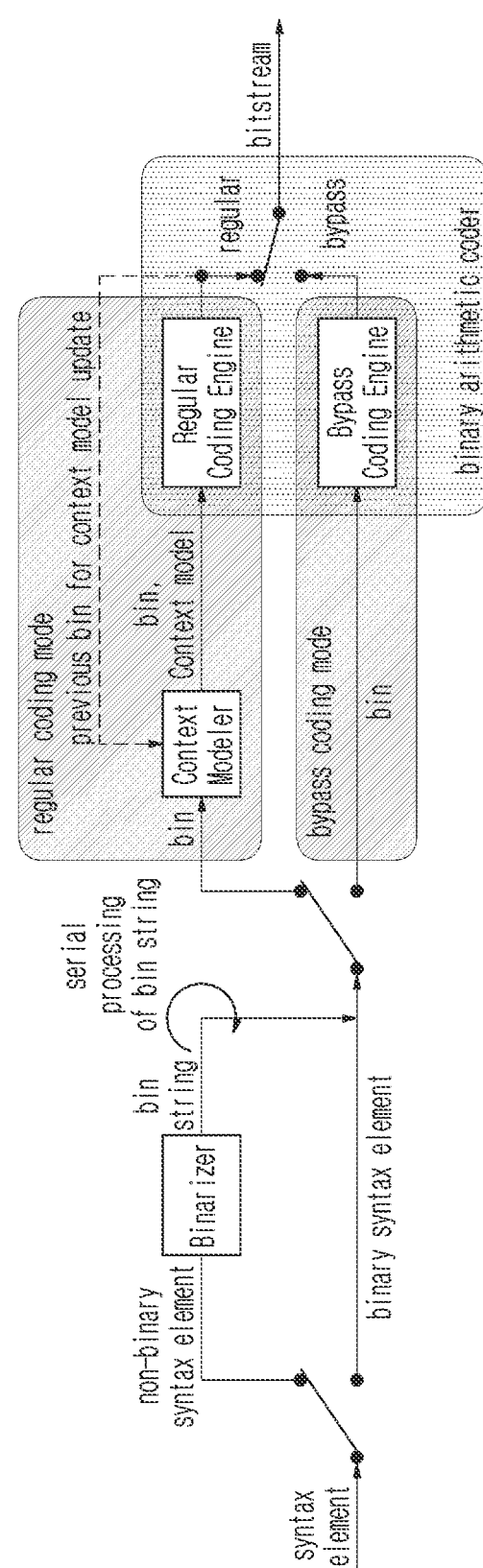
FIG. 9 is a diagram of a CABAC encoding structure.

FIG. 9 is a diagram of a CABAC encoding structure for encoding one syntax element.

Referring to FIG. 9, in the encoding process of CABAC, first, when an input signal is a syntax element other than a binary value, the input signal is transformed into a binary value through binarization. When the input signal already has a binary value, binarization is bypassed. Here, a binary number 0 or 1 configuring a binary value is referred to as a bin. For example, when a binary string (bin string) after binarization is 110, each of 1, 1 and 0 is referred to as one bin. The bin(s) for one syntax element may represent the value of a corresponding syntax element.

The binarized bins are input to a regular coding engine or a bypass coding engine. The regular coding engine allocates a context model reflecting a probability value to a corresponding bin and encodes the corresponding bit based on the allocated context model. In the regular coding engine, after coding each bin, a probability model for the corresponding bin may be updated. The bins coded in this way are referred to as context-coded bins. The bypass coding engine omits a procedure for estimating a probability with respect to an input bin and a procedure for updating a probability model applied to a corresponding bin after coding. An input bin is coded by applying a uniform probability distribution (e.g., 50:50) instead of allocating a context, thereby improving a coding speed. Bins coded in this way are referred to as bypass bins. A context model may be allocated and updated for each context-coded (regularly coded) bin, and the context model may be specified based on ctxidx or ctxInc. ctxidx may be derived based on ctxInc. Specifically, for example, a context index ctxidx specifying the context model for each of the regularly coded bins may be derived as a sum of a context index increment (ctxInc) and a context index offset (ctxIdxOffset). Here, ctxInc may be differently derived for each bin. ctxIdxOffset may be represented by the lowest value of ctxidx. ctxIdxOffset may generally be determined according to the slice type, and a context model for one syntax element in a slice may be distinguished/derived based on ctxinc.

In the entropy encoding procedure, whether encoding is performed through the regular coding engine or the bypass coding engine may be determined and a coding path may be switched. Entropy decoding is performed in the reverse order of the same process as entropy encoding.

The above-described entropy coding may be performed, for example, as follows.

Figures 10A, 10B, 11A:
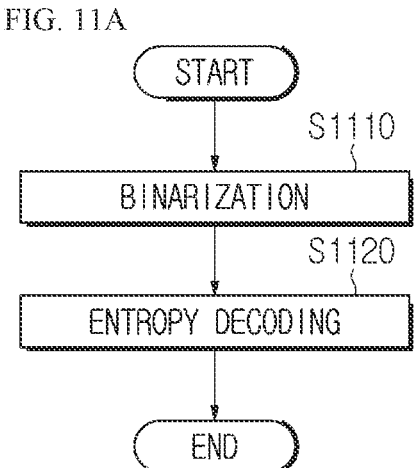
FIGS. 10a and 10b are diagrams illustrating an entropy encoding procedure.
FIGS. 11a and 11b are diagrams illustrating an entropy decoding procedure.

FIGS. 10a and 10b are diagrams illustrating an entropy encoding procedure.

Referring to FIGS. 10a and 10b together, an encoder (entropy encoder) may perform an entropy coding procedure on feature/feature map information. The feature/feature map information may include prediction related information (e.g., inter/intra prediction distinction information, intra prediction mode information, inter prediction mode information, etc.), residual information, in-loop filtering related information, etc. or may include various syntax elements related thereto. Entropy coding may be performed in units of syntax elements.

The encoder performs binarization with respect to a target syntax element (S1010). Here, binarization may be based on various binarization methods such as a Truncated Rice binarization process, Fixed-length binarization process, etc., and the binarization method for the target syntax element may be predefined. The binarization procedure may be performed by a binarization unit 1010 in the entropy encoder 1000.

The encoder may entropy encoding with respect to the target syntax element (S1020). The encoder may perform regular coding based (context based) or bypass coding based encoding with respect to a bin string of the target syntax element based on an entropy coding technique such as CABAC (context-adaptive arithmetic coding) or CAVLC (context-adaptive variable length coding), and the output thereof may be included in a bitstream. The entropy encoding procedure may be performed by an entropy encoding processor 1020 in the entropy encoder 1000. As described above, the output bitstream may be forwarded to a decoder through a (digital) storage medium or a network.

Figure 11B:
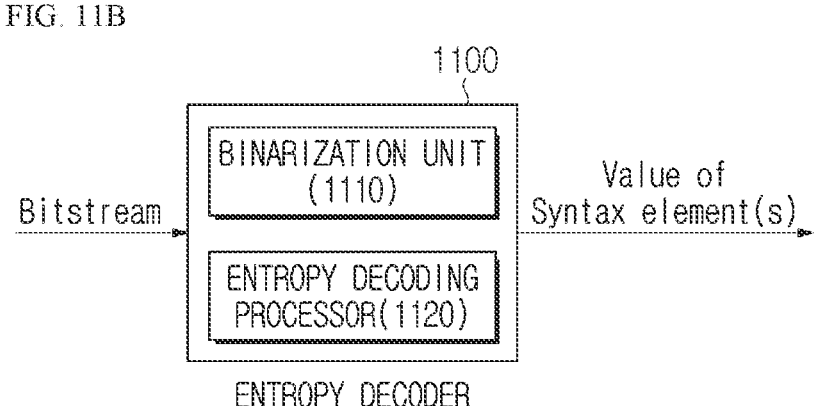

FIGS. 11a and 11b are diagrams illustrating an entropy decoding procedure.

Referring to FIGS. 11a and 11b together, the decoder (entropy decoder) may decode encoded feature/feature map information. The feature/feature map information may include prediction related information (e.g., inter/intra prediction distinction information, intra prediction mode information, inter prediction mode information, etc.), residual information, in-loop filtering related information, etc. or may include various syntax elements related thereto. Entropy coding may be performed in units of syntax elements.

The decoder may perform binarization with respect to a target syntax element (S1110). Here, binarization may be based on various binarization methods such as a Truncated Rice binarization process, Fixed-length binarization process, etc., and the binarization method for the target syntax element may be predefined. The decoder may derive available bin strings (bin string candidates) for available values of the target syntax element through the binarization procedure. The binarization procedure may be performed by a binarization unit 1110 in the entropy decoder 1100.

The decoder may perform entropy decoding with respect to the target syntax element (S1120). The decoder may compare the derived bin string with available bin strings for a corresponding syntax element, while sequentially decoding and parsing the bins for the target syntax element from input bit(s) in the bitstream. If the derived bin string is equal to one of the available bin strings, a value corresponding to the corresponding bin string is derived as a value of the corresponding syntax element. If not, the above-described procedure is performed again after a next bit in the bitstream is further parsed. Through such a process, corresponding information may be signaled using a variable length bit without using a start or end bit for specific information (specific syntax element) in the bitstream. Through this, a relatively fewer bits may be allocated to a low value and overall coding efficiency may be improved.

The decoder may perform context based or bypass based decoding with respect to the bins in the bin string from the bitstream based on an entropy coding technique such as CABAC or CAVLC. The entropy decoding procedure may be performed by an entropy decoding processor 1120 in the entropy decoder 1100. The bitstream may include a variety of information for feature/feature map decoding as described above. As described above, the bitstream may be forwarded to the decoder through a (digital) storage medium or a network.

In the present disclosure, a table (syntax table) including syntax elements may be used to specify signaling of information from an encoder to a decoder. The order of the syntax elements of the table including the syntax elements used in the present disclosure may specify the parsing order of the syntax elements from the bitstream. The encoder may construct and encode the syntax table such that the decoder parses the syntax elements in the parsing order, and the decoder may parse and decode the syntax elements of the corresponding syntax table from the bitstream according to the parsing order and obtain the values of the syntax elements.

Figure 12:
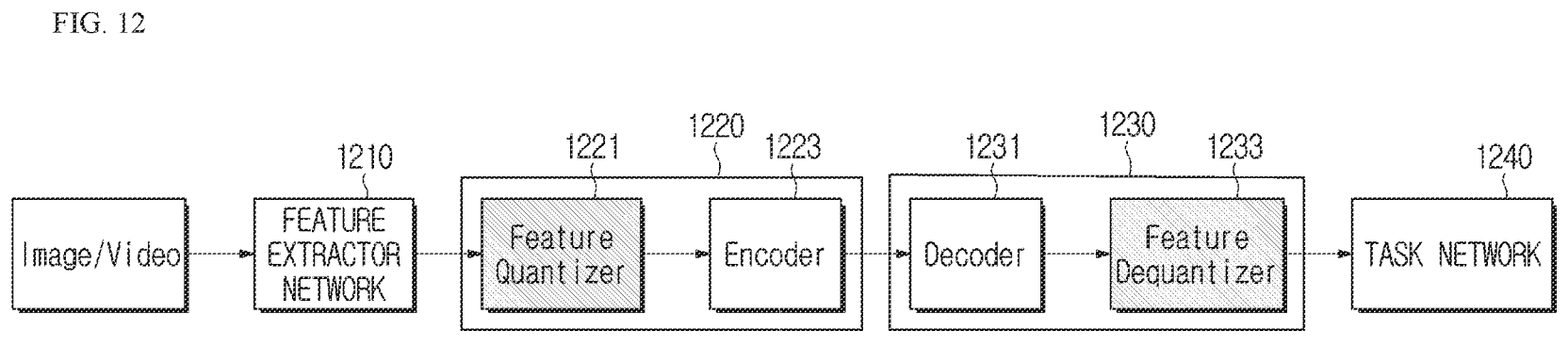

FIG. 12 is a diagram showing a feature encoding apparatus and a feature decoding apparatus.

Referring to FIG. 12, feature data obtained from an input image may be forwarded to the feature encoding apparatus 1220 by a feature extraction network 1210. The output of the feature extraction network may be data in floating point form, as described above, and the data in floating point form may be quantized by a feature quantizer 1221 and transformed into integer data with a predefined number of bits. An encoder 1223 may encode the feature data transformed into the integer data and output it in the form of a bitstream, and a decoder 1231 may receive the bitstream and output decoded feature data. At this time, the output value of the decoder 1231 may be quantized data, and a feature dequantizer 1233 may dequantize the quantized data and forward it to a task network 1240. The task network 1240 may generate a final output value through a network suitable for each task based on the feature data reconstructed through the above-described process.

Figure 13:
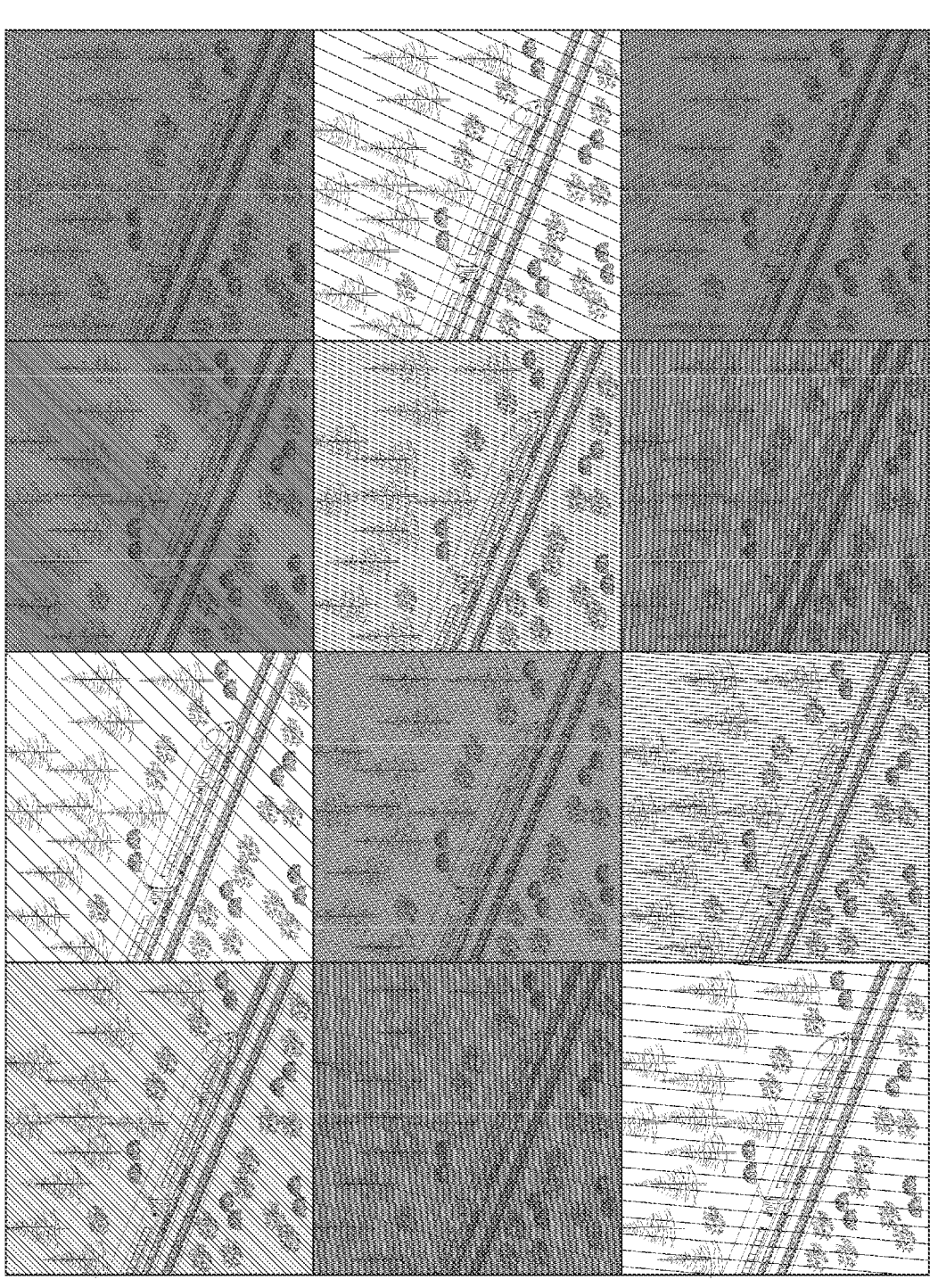
FIG. 13 is a diagram showing an example of transforming feature information.

The feature information input to the feature encoding apparatus 1220 may be the output of the feature extraction network 1210 transformed into a form that is easy to compress. An example of the transform is shown in FIG. 13. Referring to FIG. 13, 12 channels may be connected to each other to form one large picture. In this case, 12 channels may be integrated into one channel and then input to the encoder and encoded into one frame. At this time, it may be considered to use an existing video codec to encode the frame. However, the existing video codec was designed to compress a relatively small number of channels, such as RGB or YUV, and have a problem in that it is not suitable for compressing dozens of channel information output through the feature extraction network. Specifically, the entropy coding technique of the existing video codec is explained as an example as follows.

CABAC performs coding while updating a probability model for context (regular coding mode). Therefore, when the context distribution characteristics between encoding targets are similar, the probability model becomes more accurate and may show high performance. On the other hand, in the case of data for which it is difficult to estimate the probability of the context, bypass coding is performed by applying the uniform probability distribution instead of allocating the context (bypass coding mode).

Figure 14:
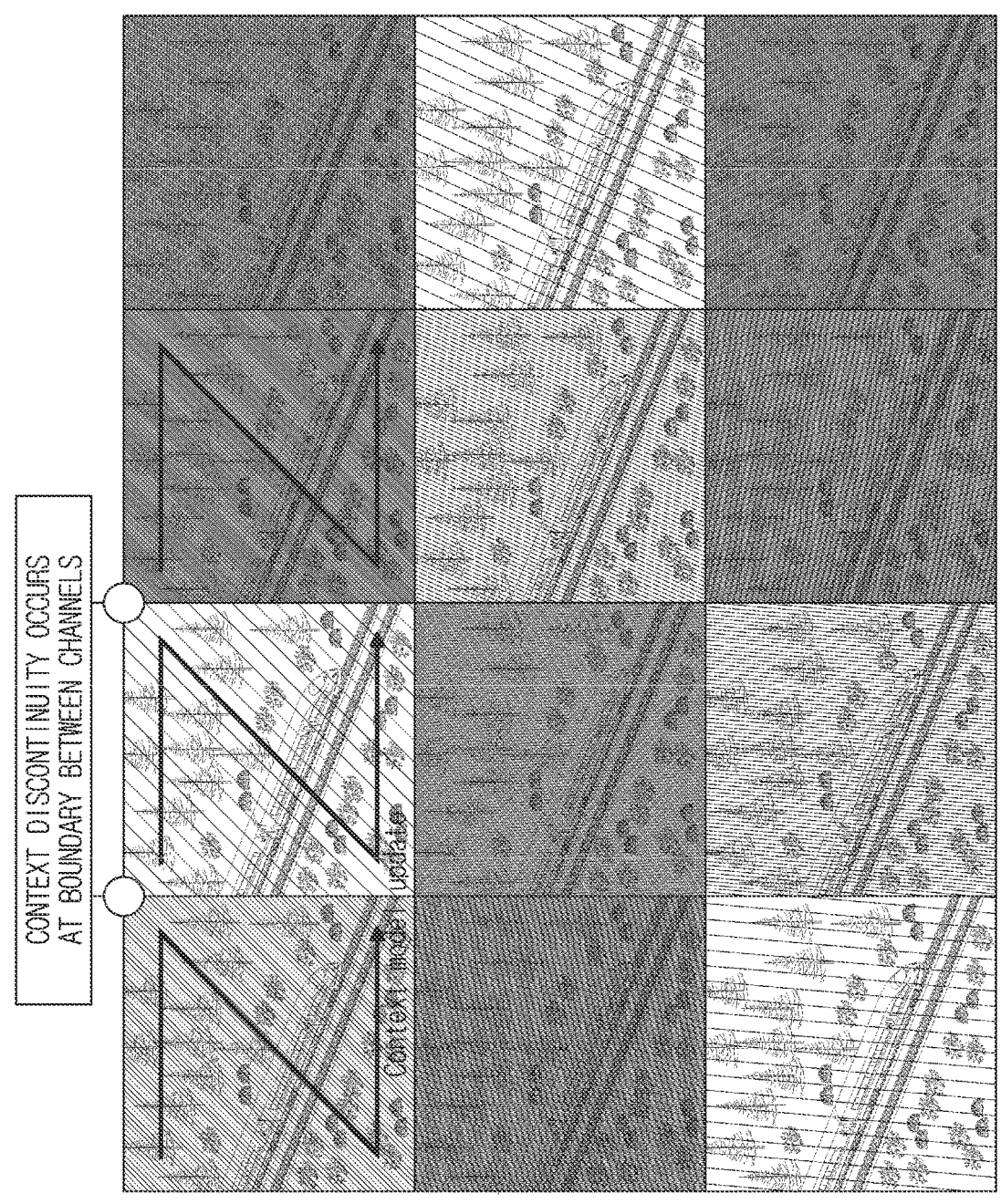
FIG. 14 is a diagram for explaining problems occurring when applying a CABAC entropy coding technique to channel coding.

Meanwhile, a feature map may be composed of multiple channels with different data distribution characteristics. The multiple channels may be reconfigured into a form that is easy for encoding, as in the example of FIG. 13. At this time, context discontinuity may occur at a boundary between channels. Specifically, since multiple channels may have different data distribution characteristics, a prediction mode used for channel encoding may also be different for each channel. For example, in the case of channel 0 in FIG. 14, edge information is removed, so there is a high possibility that a prediction mode (e.g., DC mode) suitable for a smooth signal will be selected when intra prediction is applied. In contrast, in the case of channel 1, the edge characteristics are stronger than those of channel 0, so there is a high possibility that a prediction mode (e.g., angular mode) suitable for signals with directional characteristics will be selected. At this time, when encoding is performed sequentially while updating the context model from channel 0 to channel 11, context discontinuity may occur, which may result in a decrease in coding efficiency.

Accordingly, according to embodiments of the present disclosure, a new entropy coding technique that considers the data distribution characteristics of each channel may be provided for channel encoding of a feature map. Hereinafter, embodiments of the present disclosure will be described in detail with reference to the attached drawings.

Embodiment 1

Embodiment 1 of the present disclosure relates to a method of initializing a context model (i.e., entropy coding initialization) to prevent degradation of coding efficiency due to context discontinuity occurring at a boundary between channels. According to Embodiment 1, entropy coding initialization may be performed for each channel of a feature map, and for this purpose, syntaxes such as those shown in FIGS. 15a and 15b may be provided.

FIGS. 15a and 15b are diagrams showing syntaxes for entropy coding initialization according to an embodiment of the present disclosure.

First, referring to FIG. 15a, the syntax Feature_seq_parameter_set_rbsp( ) may include syntax elements sps_entropy_coding_init_flag and channel_entropy_coding_enabled_flag.

The syntax element sps_entropy_coding_init_flag may specify whether entropy coding initialization is performed. For example, sps_entropy_coding_init_flag with a first value (e.g., 1) may specify that entropy coding initialization (e.g., context mode) is performed when encoding/decoding a first coding unit of a channel. In contrast, sps_entropy_coding_init_flag with a second value (e.g., 0) may specify that entropy coding is performed using existing information (e.g., context model) without performing entropy coding initialization. If sps_entropy_coding_init_flag has the first value (e.g., 1), channel_entropy_coding_enabled_flag, which will be described later, may be signaled.

The syntax element channel_entropy_coding_enabled_flag may specify whether entropy coding initialization may be performed for each channel (i.e., whether channel-based initialization is activated). For example, channel_entropy_coding_enabled_flag with a first value (e.g., 1) may specify that entropy coding initialization may be performed for each channel (i.e., channel unit). In contrast, channel_entropy_coding_enabled_flag with a second value (e.g., 0) may specify that entropy coding initialization is not performed for each channel. In this case, entropy coding initialization is performed only once for all channels constituting one frame, and when data distribution characteristics between channels are similar, it can be advantageous in terms of coding efficiency.

Next, referring to FIG. 15b, the syntax Feature_Channel_parameter_set_rbsp( ) may include a syntax element channel_entropy_coding_init_flag.

The syntax element channel_entropy_coding_init_flag may specify whether entropy coding initialization is performed for a current channel referencing the corresponding syntax. For example, channel_entropy_coding_init_flag with a first value (e.g., 1) may specify that entropy coding initialization is performed at the time of encoding/decoding of the current channel. In contrast, channel_entropy_coding_init_flag with a second value (e.g., 0) may specify that entropy coding initialization is not performed at the time of encoding/decoding of the current channel, channel_entropy_coding_init_flag may be signaled only when both the syntax elements sps_entropy_coding_init_flag and channel_entropy_coding_enable_flag of FIG. 15a have a first value (e.g., 1).

Meanwhile, channels to which the above-described entropy coding initialization method is applicable may include not only channels output through a feature extraction network but also channels transformed from the corresponding channels. A specific example is as shown in FIG. 16.

FIG. 16 is a diagram illustrating examples of channels to which an entropy coding initialization method according to an embodiment of the present disclosure is applicable.

Referring to FIG. 16, PCA prediction data may be composed of a mean feature channel $\mu$, principal component channels $C_0$ to $C_{n-1}$, and feature representation on a reduced dimension. At this time, the mean feature channel $\mu$ and the principal component channels $C_0$ to $C_n$-1 may be objects to which the entropy coding initialization method described above is applied.

According to Embodiment 1 of the present disclosure, whether to perform entropy coding initialization and whether to perform channel-based initialization may be determined at a sequence level. Upon determining that channel-based initialization is performed, whether to perform entropy coding initialization may be determined individually for each channel. Accordingly, it is possible to remove context discontinuity occurring at a boundary between channels, thereby further improving coding efficiency and accuracy.

Embodiment 2

Embodiment 2 of the present disclosure relates to a method of synchronizing a context model between channels with similar data distribution characteristics.

According to Embodiment 2, channels with similar data distribution characteristics may be grouped, and a context model may be synchronized and used between channels belonging to the same channel group. In one embodiment, the similarity of data distribution characteristics between channels may be determined based on at least one of edge characteristics, mean value $\mu$, standard deviation $\sigma$, maximum value Max, or minimum value Min of each channel. For example, channels with a difference between the mean values of feature elements less than a predetermined threshold may be classified into similar channels. Alternatively, channels with a difference between the mean values of feature elements greater than or equal to the threshold may be classified into different channels. The data distribution characteristics of the feature/feature map are as described above with reference to Tables 1 to 3.

Additionally, according to Embodiment 2, channels included in the feature map may be reordered based on the similarity of data distribution characteristics, and the context model may be synchronized and used between adjacent channels. Depending on the embodiment, the channel grouping and the channel reordering may be performed together. For example, after grouping channels based on the similarity of data distribution characteristics, channels belonging to each channel group may be reordered based on the similarity. At this time, context model synchronization may be limited to be performed only between a certain number (e.g., up to 4) of adjacent channels within each channel group.

Figure 17A:
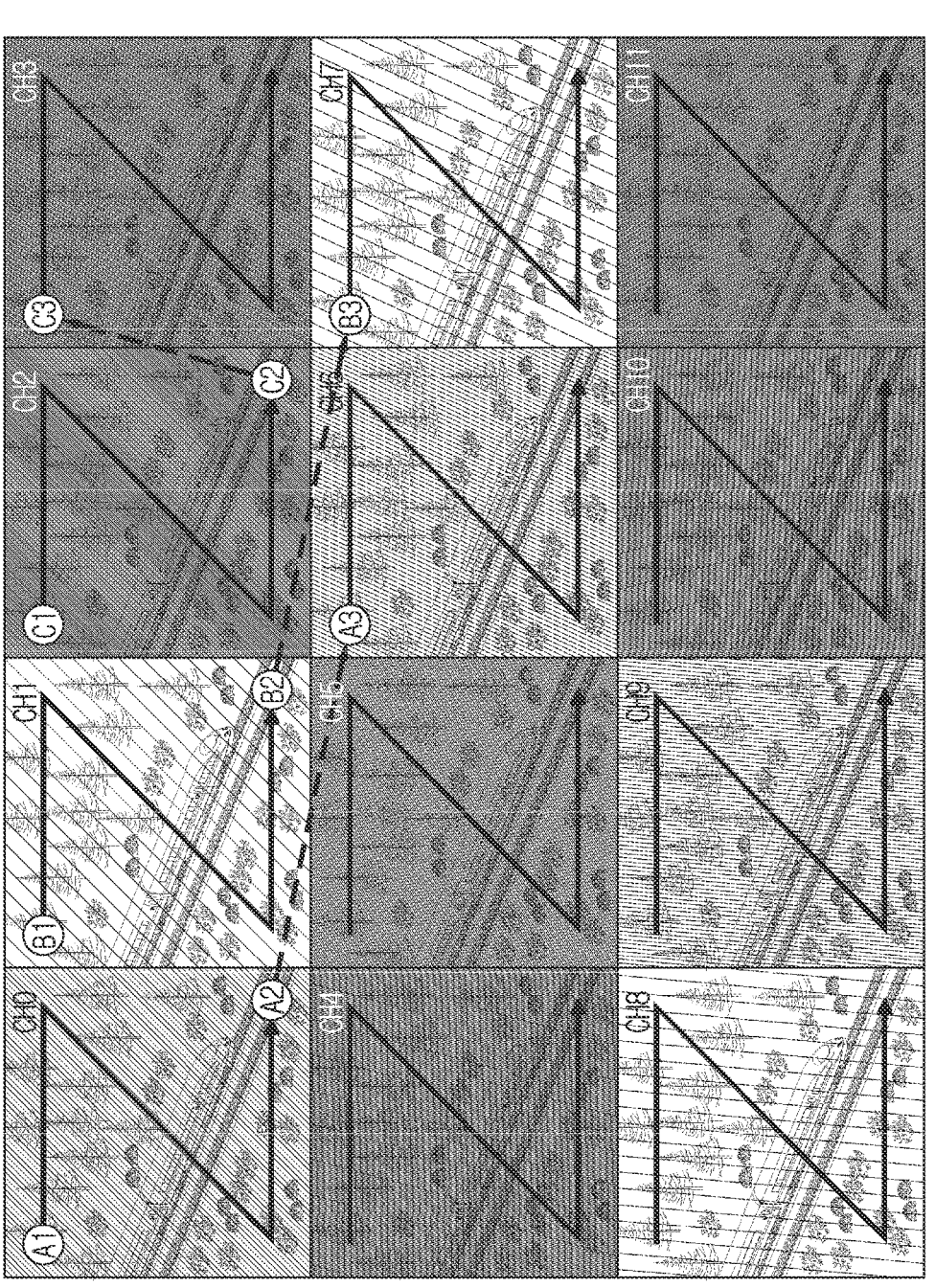
FIGS. 17a and 17b are diagrams for explaining a context model synchronization method according to an embodiment of the present disclosure.
Figure 17B:
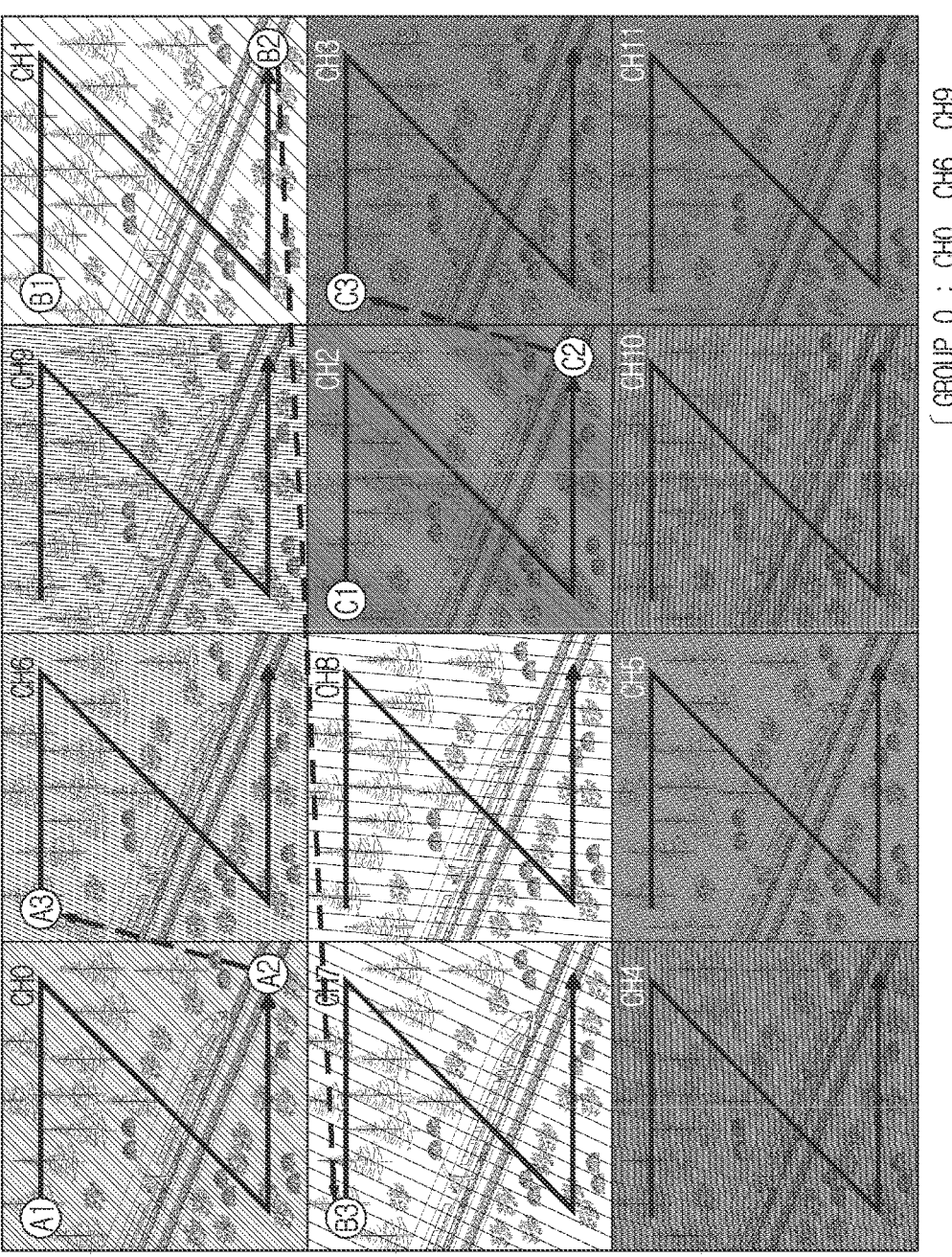

FIGS. 17a and 17b are diagrams for explaining a context model synchronization method according to an embodiment of the present disclosure.

In FIGS. 17a and 17b, channel 0, channel 6, and channel 9 have similar data distribution characteristics (e.g., mean value, edge characteristics, etc.), and channel 1, channel 7, and channel 8 have similar data distribution characteristics, channels 2 to 5 and channels 10 and 11 may have similar data distribution characteristics. Accordingly, channel 0, channel 6, and channel 9 may be grouped into channel group 0, channel 1, channel 7, and channel 8 may be grouped into channel group 1, and channels 2 to 5 and channels 10 and 11 may grouped into channel group 2. However, since the channel grouping method of FIGS. 17a and 17b is illustrative, embodiments of the present disclosure are not limited thereto. For example, depending on system requirements, task purpose, encoder/decoder design, etc., the number of channel groups and grouping method may be set and changed in various ways. Meanwhile, depending on the embodiment, the channels of the feature map may be grouped and reordered (in encoding/decoding order) based on the similarity of data distribution characteristics. FIG. 17a shows an example in which only channel grouping is performed, and FIG. 17b shows an example in which both channel grouping and reordering are performed.

First, referring to FIG. 17a, channel encoding/decoding may be sequentially performed from channel 0 to channel 11. When encoding/decoding a first coding unit of channel 0, channel 0 is a first channel belonging to channel group 0 and thus a context model may be initialized (A1). When encoding/decoding according to Z-scan order for channel 0 is completed, the context model may be stored for the next channel (A2). In one embodiment, a certain storage space (e.g., context buffer) for storing the context model may be predefined. Additionally, the stored context model may be used as a context model for channel 6, which is the next encoding/decoding target within channel group 0 (A3). In other words, when encoding/decoding a first coding unit of channel 6, the context model stored immediately before within the same channel group 0 may be synchronized and used, rather than initializing and using the context model.

Additionally, when encoding/decoding a first coding unit of channel 1, since channel 1 is a first channel belonging to channel group 1, context model initialization may be performed (B1). When encoding/decoding according to the Z-scan order for channel 1 is completed, the context model may be stored for the next channel (B2). Additionally, the stored context model may be synchronized and used as a context model for channel 7, which is the next encoding/decoding target within channel group 1 (B3).

Likewise, when encoding/decoding a first coding unit of channel 2, since channel 2 is a first channel belonging to channel group 2, context model initialization may be performed (C1). When encoding/decoding according to the Z-scan order for channel 2 is completed, the context model may be stored for the next channel (C2). Additionally, the stored context model may be synchronized and used as a context model for channel 3, which is the next encoding/decoding target within channel group 2 (C3).

As in the example of FIG. 17a above, by synchronizing and using the context model between channels belonging to the same channel group, the accuracy of the probability model can be increased and coding efficiency can be further improved.

Next, referring to FIG. 17b, 12 channels grouped into 3 channel groups may be reordered (in decoding order) according to the similarity of data distribution characteristics. Accordingly, channel encoding/decoding may proceed in the following order: channel 0, channel 6, channel 9, channel 1, channel 7, channel 8, channels 2 to 5, and channels 10 to 11. When encoding/decoding a first coding unit of channel 0, the context model for channel group 0 may be initialized (A1). Additionally, the last updated context model for channel 0 may be synchronized and used as the context model for channel 6, which is the next encoding/decoding target (A3). At this time, the last updated context model may mean a context model upon completion of encoding/decoding for channel 0, and may be stored in a predetermined storage space (e.g., context buffer) for the next channel (A2). Alternatively, depending on the embodiment, the last updated context model may be used for the next channel without being stored separately. This can be seen as a result of the fact that the context model may be used continuously through channel reordering. When encoding/decoding for channel group 0 is completed in this way, encoding/decoding for channel group 1 may proceed.

When encoding/decoding the first coding unit of channel 1 belonging to channel group 1, the context model may be initialized (B1), and the last updated context model for channel 1 may be synchronized and used as a context model for channel 7, which is the next encoding/decoding target (B3). At this time, the last updated context model may be stored in a predetermined storage space for the next channel (B2), or may be used for the next channel without separate storage. When encoding/decoding for channel group 1 is completed in this way, encoding/decoding for channel group 2 may proceed.

Likewise, when encoding/decoding a first coding unit of channel 2 belonging to channel group 2, the context model may be initialized (C1), and the last updated context model for channel 2 may be synchronized and used as a context model for channel 3, which is the next encoding/decoding target (C3). At this time, the last updated context model may be stored in a predetermined storage space for the next channel (C2), or may be used for the next channel without separate storage.

As shown in the example of FIG. 17*b* above, context model synchronization is performed by performing both channel grouping and reordering based on the similarity of data distribution characteristics, thereby improving the accuracy of the probability model and further improving coding efficiency. Additionally, depending on the embodiment, a separate storage space for storing the context model becomes unnecessary, thereby reducing memory consumption and suppressing an increase in complexity due to changing the context model.

Figures 18, 19:
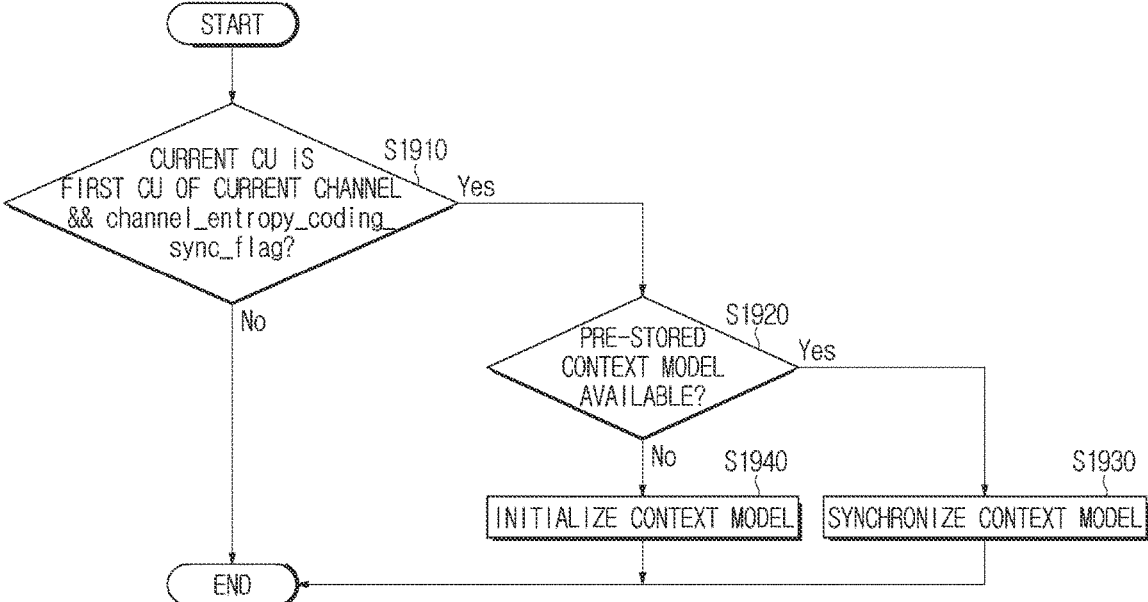
FIG. 18 is a diagram illustrating syntax for entropy coding synchronization according to an embodiment of the present disclosure.
FIG. 19 is a flowchart showing an entropy coding synchronization process according to an embodiment of the present disclosure.

Meanwhile, to support the above-described context model synchronization (i.e., entropy coding synchronization), syntax shown in FIG. 18 may be provided.

FIG. 18 is a diagram illustrating syntax for entropy coding synchronization according to an embodiment of the present disclosure.

Referring to FIG. 18, the syntax Feature_seq_parameter_set_rbsp( ) may include a syntax element channel_entropy_coding_sync_flag.

The syntax element channel_entropy_coding_sync_flag may specify whether entropy coding synchronization is performed. For example, channel_entropy_coding_sync_flag with a first value (e.g., 1) may specify that synchronization with a pre-stored context model is performed when encoding/decoding a first coding unit of a channel. If there is no context model to be used for synchronization, the synchronization process is skipped and the context model may be newly defined and initialized and used for encoding/decoding. At this time, the available context model may vary depending on the packing and encoding method of the feature map. In contrast, channel_entropy_coding_sync_flag with a second value (e.g., 0) may specify that the synchronization is not performed.

FIG. 19 is a flowchart showing an entropy coding synchronization process according to an embodiment of the present disclosure. Each step of FIG. 19 may be performed by the feature encoding apparatus or feature decoding apparatus described above with reference to FIG. 12. Hereinafter, for convenience of explanation, each step of FIG. 19 will be described based on the feature encoding apparatus.

Referring to FIG. 19, the feature encoding apparatus may determine whether a current coding unit to be encoded is a first coding unit of a channel and whether entropy coding synchronization is performed (S1910). In one embodiment, whether to perform entropy coding synchronization may be determined based on the channel_entropy_coding_sync_flag described above with reference to FIG. 18.

As a result of the determination, if the current coding unit is the first coding unit of the channel and entropy coding synchronization is performed (e.g., channel_entropy_coding_sync_flag=1) ('YES' in S1910), the feature encoding apparatus may determine whether a pre-stored context model is available (S1920).

As a result of the determination, if the pre-stored context model is available ('YES' in S1920), the feature encoding apparatus may synchronize the context model for the current channel with the pre-stored context model (S1930).

In contrast, if the pre-stored context model is not available ('NO' in S1920), the feature encoding apparatus may initialize the context model for the current channel (S1940). In initializing the context model, of course, the entropy coding initialization method of Embodiment 1 described above is applicable.

Meanwhile, if the current coding unit is not the first coding unit of the channel or entropy coding synchronization is not performed ('NO' in S1910), the entropy coding synchronization process may be skipped. In this case, the feature encoding apparatus may encode the current coding unit using a context model applied to a previous coding unit in coding order or a context model applied to a previous channel in coding order.

According to Embodiment 2 of the present disclosure, inter-channel entropy coding synchronization may be performed. To this end, channel grouping and reordering may be performed based on the similarity of data distribution characteristics. Accordingly, compared to initializing the context model for each channel without any conditions at the boundary between channels, redundancy in the probability model is removed and accuracy is increased, thereby further improving coding efficiency.

Embodiment 3

Embodiment 3 of the present disclosure relates to a method of applying a multi-context model to a channel and a method of synchronizing a context model.

In the case of feature maps, unlike general images/videos, spatial correlation is not high. In other words, there may be multiple areas with different data distribution characteristics even within a channel. Therefore, applying only one context model to a channel may be inefficient. Accordingly, according to Embodiment 3, a plurality of areas with similar data distribution characteristics within a channel may be defined, and different context models may be applied to each of the areas. Furthermore, the context model may be synchronized between coding units existing at the same position or corresponding position.

FIG. 20 is a diagram for explaining a multi-context model application and synchronization method according to an embodiment of the present disclosure.

Referring to FIG. 20, four areas may be defined within channel 0 based on the similarity of data distribution characteristics (e.g., edge characteristics, mean value, etc.). In addition, different context models may be applied to each area. For example, context model 0 may be applied to a first area, context model 1 may be applied to a second area, context model 2 may be applied to a third area, and context model 3 may be applied to a fourth area.

After encoding/decoding for channel 0 is completed, when performing encoding/decoding on channel 1, context model synchronization based on the position within the channel may be performed. For example, the context model for the current coding unit in channel 1 may be set (or synchronized) to context model 0 applied to the same or corresponding position as the current coding unit in channel 0 for which encoding/decoding has been completed. Here, the same or corresponding position may mean a position with the same coordinates as the upper left position of the current coding unit within the reference channel. Meanwhile, to support the application and synchronization of the above-described multi-context model, the syntax shown in FIG. 21 may be provided.

FIG. 21 is a diagram illustrating syntax for application and synchronization of a multi-context model according to an embodiment of the present disclosure.

Referring to FIG. 21, the syntax Feature_seq_parameter_set_rbsp( ) may include syntax elements channel_entropy_coding_collocated_sync_flag, multiple_context_enable_flag, and num_context_model_minusL.

The syntax element channel_entropy_coding_collocated_sync_flag may specify whether synchronization is performed with a context model at the same or corresponding position in the previous channel in the current channel referencing the corresponding syntax. For example, channel_entropy_coding_collocated_sync_flag with a first value (e.g., 1) may specify that synchronization is performed with a context model at the same position or a corresponding position in the current channel. In contrast, channel_entropy_coding_collocated_sync_flag with a second value (e.g., 0) may specify that synchronization with the context model at the same position or corresponding position in the current channel is not performed.

The syntax element multiple_context_enable_flag may specify whether a plurality of context models, that is, a multi-context model, are applicable to the current channel. For example, channel_entropy_coding_collocated_sync_flag with a first value (e.g., 1) may specify that the multi-context model is applicable (i.e., activated) to the current channel. In contrast, channel_entropy_coding_collocated_sync_flag with a second value (e.g., 0) may specify that the multi-context model is not applicable to the current channel (i.e., deactivated).

The syntax element num_context_model_minus1 may specify a value obtained by subtracting 1 from a maximum available context model. num_context_model_minus1 may be signaled only when multiple_context_enable_flag is a first value (e.g., 1).

According to Embodiment 3 of the present disclosure, an area-based multiple context model is applicable to each channel. Additionally, context model synchronization at the same position or corresponding position between channels may be performed. Accordingly, since the data distribution characteristics of the channel can be more accurately reflected, redundancy in the probability model is removed, accuracy is increased, thereby further improving coding efficiency.

Embodiment 4

Embodiment 4 of the present disclosure relates to a channel grouping method.

Tiles and subpictures of existing video codecs are aimed at independent encoding/decoding. That is, since different tiles and subpictures do not depend on each other for encoding/decoding, spatial prediction and entropy coding processes may be applied independently. In contrast, Embodiments 1 to 4 described above relate to context model management (i.e., initialization and/or synchronization) at a boundary between channels, and are aimed at discontinuity removal and coding efficiency improvement at the boundary between channels rather than independent encoding/decoding of the channel. Therefore, in VCM, the independence of spatial prediction and entropy coding processes may not exist. Furthermore, in existing video codecs, tiles are continuously defined by dividing them into tile columns and rows, and the position of a current tile may be derived based on the current encoding/decoding position and information about the tile column and row. On the other hand, in VCM, spatial continuity may not exist between channels constituting a channel group.

Since the data distribution characteristics of the channel group are defined based on the data distribution characteristics of each channel, information about the channel group needs to be encoded/decoded separately. Additionally, since the number of channels belonging to a channel group may also vary based on the data distribution characteristics of each channel, information on the number of channels belonging to the channel group also needs to be encoded/decoded separately. According to Embodiment 4, syntaxes for signaling a channel grouping method and related information may be provided.

In one embodiment, a plurality of channels included in the feature map may be grouped based on a clustering technique. The specific process thereof is shown in Table 4 below.

TABLE 4

| Channel grouping method I |
| --- |
| 1. Feature extraction process |
| a. Extract feature/feature map from input data |
| Feature map clustering process |
| a. Set (define) how many channel groups the feature map will be grouped into |
| b. Classify and group channels based on settings (definition) |
| Feature encoding process |
| a. Perform entropy encoding by defining context model for each channel group |

In Table 4, through the clustering process, (channel) clusters may be constructed so that the similarity between data belonging to the same (channel) cluster is higher than the similarity between data belonging to different (channel) clusters. Depending on the embodiment, the similarity between the data may be determined based on Euclidean distance. For example, data whose Euclidean distance is less than a predetermined threshold may be classified as having relatively high similarity, and data whose Euclidean distance is greater than the threshold may be classified as having relatively low similarity. As shown in FIG. 22, the clustering process may be performed at the rear stage of the feature extraction process and at the front stage of the feature coding process.

In another embodiment, a plurality of channels included in the feature map may be grouped based on a predetermined threshold. The specific process thereof is shown in Table 5 below.

TABLE 5

| Channel grouping method II |
| --- |
| 1. Feature extraction process |
| a. Extract feature/feature map from input data |
| 2. Channel groping process |
| a. Set (define) how many channel groups the feature map will be grouped into |
| i) Set threshold for channel grouping |
| b. Classify and group channels based on settings (definition) |
| 3. Feature encoding process |
| a. Perform entropy encoding by defining context model for each channel group |

In Table 5, the number of set thresholds may be determined based on the number of channel groups (e.g., number of thresholds=number of channel groups−1). Additionally, the threshold value may vary depending on system requirements, task purpose, and encoder/decoder design, and may be adaptively determined by reflecting the statistical characteristics (e.g., mean value, variance, etc.) of the feature values of the already encoded/decoded feature map (or frame).

The above-described examples are only one of various examples of channel grouping methods, and embodiments of the present disclosure are not limited thereto. For example, channels may be grouped in various ways depending on task purpose, image type, etc. The channel grouping process may be executed by an external network (e.g., channel grouping manager) together with or separately from the feature extraction process. For example, unlike those shown in FIG. 22, the channel grouping process may be performed by an external network in the front stage of the encoder.

Meanwhile, for channel decoding, channel grouping-related information (e.g., grouping result—mapping table, threshold, etc.) may be encoded and signaled to the decoder. Channel grouping-related information may be defined at multiple layers. For example, as shown in FIG. 23, channel grouping-related information may be defined at the channel level. To signal channel grouping-related information at the channel level, syntaxes such as those shown in FIGS. 24a and 24b may be provided.

FIG. 24a is a diagram illustrating feature channel coding syntax according to an embodiment of the present disclosure.

Referring to FIG. 24a, the feature channel coding syntax (Feature_channel_coding( )) may include syntax elements channel_group_id and channel_group_id_sync_flag. The feature channel coding syntax (Feature_channel coding( )) is an example of encoding/decoding channel grouping-related information in units of channels.

The syntax element channel_group_id may specify a channel group to which a current channel referencing the syntax belongs. In the example of FIG. 23, channel_group_id of channel 0 may be 0, and channel_group_id of channel 1 may be 2, channel_group_id may be signaled only when the channel_entropy_coding_sync_flag described above with reference to FIG. 18 has a first value (e.g., 1) (i.e., when inter-channel entropy coding synchronization is performed).

If a context model corresponding to channel_group_id exists (contextmodel[channel_group_id]=true), it may be used for entropy coding by synchronizing with the corresponding context model (synchronization(contextmodel[channel_group_id])). In contrast, if the context model corresponding to channel_group_id does not exist (contextmodel[channel_group_id]=false), the context model may be initialized (initialization(contextmodel[channel_group_id])).

Meanwhile, because each channel represents unique characteristics of the input video, it may have similar data distribution characteristics between adjacent frames (i.e., temporally). Accordingly, channel_group_id may be the same or similar between corresponding channels of adjacent frames. Accordingly, channel_group_id reuse information of the previous frame may be signaled.

FIG. 24b is a diagram showing a feature frame parameter set according to an embodiment of the present disclosure.

Referring to FIG. 24b, the feature frame parameter set (feature_frame_parameter_set_rbsp( )) may include a syntax element channel_group_id_sync_flag.

The syntax element channel_group_id_sync_flag may specify whether to reuse the channel_group_id of a previous (feature) frame for the current (feature) frame referencing the parameter set. For example, channel_group_id_sync_flag with a first value (e.g., 1) may specify that the channel_group_id of the previous (feature) frame is reused. In contrast, channel_group_id_sync_flag with a second value (e.g., 0) may specify that the channel_group_id of the previous (feature) frame is not reused and the channel_group_id is encoded/decoded for the current (feature) frame.

An example of feature channel coding syntax that specifies whether to reuse channel_group_id is shown in FIG. 25.

FIG. 25 is a diagram showing feature channel coding syntax according to an embodiment of the present disclosure.

Referring to FIG. 25, the feature channel coding syntax (Feature_channel_coding( )) may include a syntax element channel_group_id. The semantics of channel_group_id are as described above with reference to FIG. 22a.

If channel_entropy_coding_sync_flag has a first value (e.g., 1) (i.e., when inter-channel entropy coding synchronization is performed), the channel group of the current channel referencing the syntax may be set to be the same as the channel group at the same or corresponding position in the previous frame (channel_group_id=prev_channel_group_id).

As in the above example, channel_group_id may be defined at a channel level, but may also be defined at a higher level, for example, a frame level. For example, in the example of FIG. 21, channel_group_id may be encoded/decoded in channel order at the frame level. To signal channel grouping-related information at the frame level, syntaxes such as those shown in FIGS. 24a and 24b may be provided.

FIG. 26a is a diagram showing a feature sequence parameter set according to an embodiment of the present disclosure.

Referring to FIG. 26a, the feature sequence parameter set (Feature_seq_parameter_set_rbsp( )) may include syntax elements channel_entropy_coding_sync_flag, frame_group_id_enable_flag, and channel_group_ids[i].

The semantics of the syntax element channel_entropy_coding_sync_flag are as described above with reference to FIG. 18.

The syntax element frame_group_id_enable_flag may specify whether channel_group_id is encoded/decoded at the frame level or the channel level. For example, frame_group_id_enable_flag with a first value (e.g., 1) may specify that channel_group_id is encoded/decoded at the frame level. In contrast, frame_group_id_enable_flag with a second value (e.g., 0) may specify that channel_group_id is encoded/decoded at the channel level.

The syntax element channel_group_ids[i] may specify the channel_group_id of each channel in the current frame referencing the feature sequence parameter set, channel_group_ids[i] may be encoded/decoded by the number of channels in the current frame (num_channel_minus1+1).

FIG. 26b is a diagram illustrating feature channel coding syntax according to an embodiment of the present disclosure.

FIG. 26b shows an example of encoding/decoding channel grouping-related information using both syntax elements frame_group_id_enable_flag and channel_group_id_sync_flag. In FIG. 26b, a variable current_channel specifies the current channel to be encoded/decoded, current_channel may be derived based on the currently encoded/decoded position, the number (size) of channels, the size of the input feature map, etc. A variable prev_channel_group_ids may specify channel_group_ids of a channel at the same or corresponding position of the previous frame. For example, 'channel_group_id=prev_channel_group_ids[current channel]' may specify that the channel_group_id of the channel at the same or corresponding position as the current channel in the previous frame is used as the channel_group_id of the current channel.

According to Embodiment 4 of the present disclosure, channels of the feature map may be grouped in various ways. Additionally, channel grouping-related information may be encoded/decoded at various levels, such as channel level or frame level.

Hereinafter, a method of configuring reference information when performing intra prediction or inter prediction will be described in detail.

Embodiment 5

Figures 27, 28A, 28B:
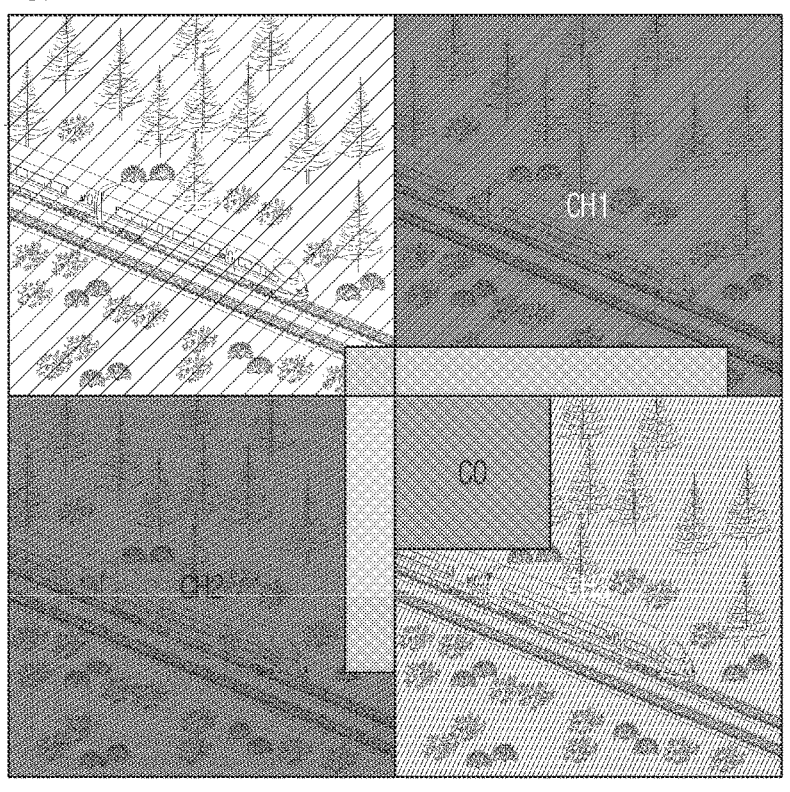
FIG. 27 is a diagram illustrating an example of a feature map composed of four consecutive channels.
FIGS. 28a and 28b are diagrams showing a feature sequence parameter set according to an embodiment of the present disclosure.

Embodiment 5 of the present disclosure relates to a method of configuring reference information for prediction. In relation to this, FIG. 27 is a diagram illustrating an example of a feature map composed of four consecutive channels. Referring to FIG. 27, the feature map may be composed of channels 0 to 3, and channels 0 to 3 may be sequentially encoded. When the upper left block of channel 3 is a current coding unit and is encoded through intra prediction, the reconstructed feature information of channels 0 to 3 adjacent to the current coding unit is used as reference information. However, since the data distribution characteristics of each channel are different and the feature information of the lower right of channel 0, lower of channel 1, and right of channel 2 is referenced, the spatial distance from the current coding unit (or position within each channel)) is not close. Therefore, if the information is used as reference information of intra prediction, coding efficiency may be reduced and unnecessary operations may be required, thereby increasing complexity.

Accordingly, according to Embodiment 5 of the present disclosure, when configuring reference information used for prediction, only the information on the current channel shall be used. Syntaxes such as FIGS. 28a and 28b may be provided to define constraints on reference information used for prediction.

FIGS. 28a and 28b are diagrams showing a feature sequence parameter set according to an embodiment of the present disclosure.

First, referring to FIG. 28a, the feature sequence parameter set (Feature_seq_parameter_set_rbsp( )) may include a syntax element channel_constrained_intra_pred_flag.

The syntax element channel_constrained_intra_pred_flag may specify whether information on a channel different from the channel of an encoding/decoding target area may be referenced during intra prediction. For example, channel_constrained_intra_pred_flag with a first value (e.g., 1) may specify that information on the different channel shall not be referenced during intra prediction. In contrast, channel_constrained_intra_pred_flag with a second value (e.g., 0) may specify that information on the different channel may be referenced during intra prediction. Here, a prediction target may mean a feature or video to be encoded/decoded. Additionally, information on the different channel does not include syntax and semantic information generated during the encoding/decoding process, and the corresponding information may be used for intra prediction regardless of channel_constrained_intra_pred_flag.

Next, referring to FIG. 28b, the feature sequence parameter set (Feature_seq_parameter_set_rbsp( )) may include a syntax element channel_constrained_inter_pred_flag.

The syntax element channel_constrained_inter_pred_flag may specify whether information on a channel different from the channel of the encoding/decoding target area may be referenced during inter prediction. For example, channel_constrained_inter_pred_flag with a first value (e.g., 1) may specify that information on the different channel shall not be referenced during inter prediction. In this case, a motion prediction and compensation range is constrained to the same channel as the current channel. In contrast, channel_constrained_inter_pred_flag with a second value (e.g., 0) may specify that information on the different channel may be referenced during inter prediction. Here, the prediction target may mean a feature or video to be encoded/decoded. Additionally, information on the different channel does not include syntax and semantic information generated during the encoding/decoding process, and the corresponding information may be used for inter prediction regardless of channel_constrained_inter_pred_flag.

Even if the reference information candidate belongs to the same channel as the current channel, if there are no prediction constraints, information on the different channel may be used during encoding/decoding. In this case, if the goal of the current encoding/decoding target is independent encoding/decoding, the corresponding reference information candidate shall not be used as reference information for intra prediction and inter prediction.

Figure 29A:
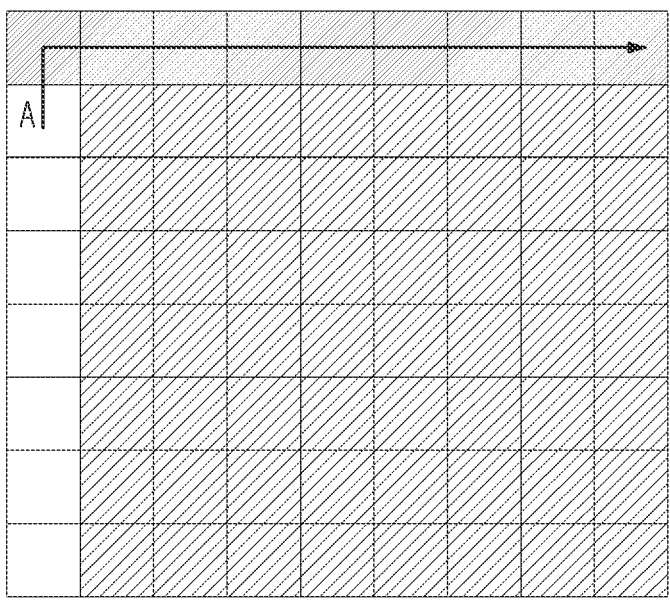
FIGS. 29a and 29b show examples of reference information replacement during intra prediction.
Figure 29B:
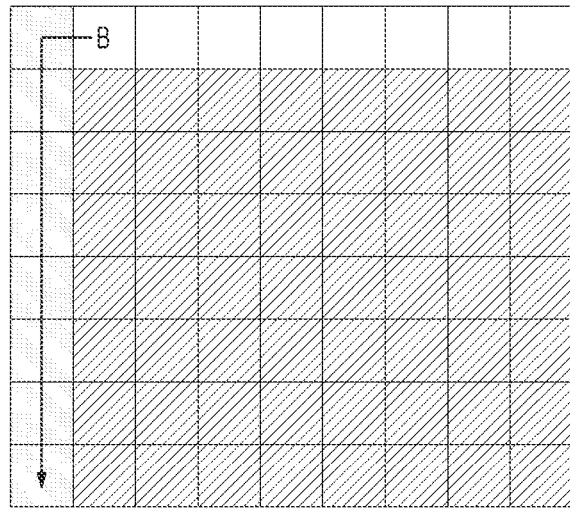

In one embodiment, when configuring reference information for intra prediction, if information on the different channel cannot be referenced, the corresponding channel information may be replaced with information on a closest available current channel. FIGS. 29a and 29b show examples of reference information replacement during intra prediction. First, referring to FIG. 29a, when the upper reference information of the encoding/decoding area within the current channel is unavailable as information on the different channel, the upper reference information may be replaced with previously reconstructed feature information of the current channel existing on the left side of the sub/decoding area. Next, referring to FIG. 29b, when the left reference information of the encoding/decoding area within the current channel is unavailable as information on the different channel, the left reference information may be replaced with the previously reconstructed information of the current channel existing above the encoding/decoding area. Meanwhile, in the above-described examples, if there is no replaceable current channel information, other unavailable channel information may be replaced with a specific value (e.g., 0).

Figures 30, 31A, 31B:
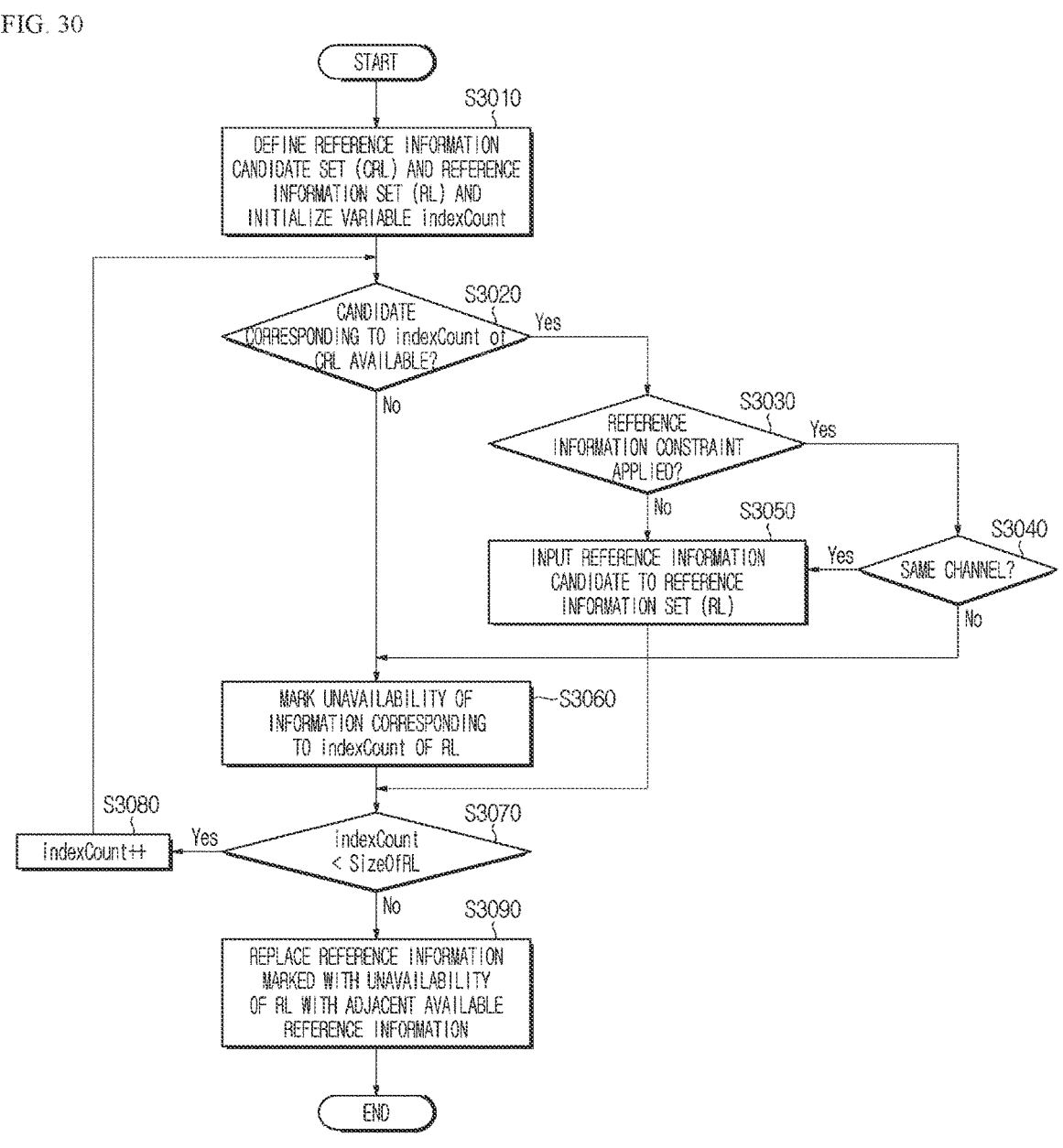
FIG. 30 is a flowchart showing a reference information replacement method according to an embodiment of the present disclosure.
FIGS. 31a to 31c are diagrams showing syntaxes including reference information control information according to an embodiment of the present disclosure.

FIG. 30 is a flowchart showing a reference information replacement method according to an embodiment of the present disclosure. Each step of FIG. 30 may be performed by the feature encoding apparatus or feature decoding apparatus described above with reference to FIG. 12. Hereinafter, for convenience of explanation, each step of FIG. 30 will be described based on the feature encoding apparatus.

Referring to FIG. 30, the feature encoding apparatus may define a reference information candidate set (CRL) and a reference information set (RL) for prediction of a current coding unit (S3010). Additionally, the feature encoding apparatus may define the size (SizeOfRL) of the reference information set (RL) and set a variable indexCount specifying a reference information index to 0.

In addition, the feature encoding apparatus may determine whether a candidate corresponding to indexCount is available in the reference information candidate set (CRL) (S3020).

As a result of the determination in step S3020, if the candidate is available ('YES' in S3020), the feature encoding apparatus may determine whether to apply the prediction constraint (e.g., channel_constrained_intra_pred_flag or channel_constrained_inter_pred_flag) (S3030).

As a result of the determination in step S3030, if the prediction constraint is applied ('YES' in S3030), the feature encoding apparatus may determine whether the reference information candidate belongs to the same channel as the current coding unit (S3040).

As a result of the determination in step S3040, if the reference information candidate belongs to the same channel as the current coding unit ('YES' in S3040), the feature encoding apparatus may input the reference information candidate to the reference information set (RL) (S3050) and proceeds to step S3060. On the other hand, if the reference information candidate belongs to a channel different from the current coding unit ('NO' in S3040), the feature encoding apparatus may determine that the reference information candidate is unavailable and input an identification marking specifying unavailability to indexCount within the reference information set (RL) (S3070).

As a result of the determination in step S3020, if the candidate is not available ('NO' in S3020), the feature encoding apparatus may proceed to step S3070 and input the above-described identification marking.

As a result of the determination in step S3030, if the prediction constraint is not applied ('NO' in S3030), the feature encoding apparatus may input the reference information candidate to the reference information set (RL) (S3050) and proceed to step S3060.

The feature encoding apparatus may determine whether indexCount is smaller than the size (SizeOfRL) of the predefined reference information set (RL) (S3060). As a result of the determination, if indexCount is smaller than the size (SizeOfRL) of the reference information set (RL) ('YES' in S3060), the feature encoding apparatus increases indexCount by 1 and returns to step S3020 to repeat the above-described process. On the other hand, if indexCount is greater than or equal to the size (SizeOfRL) of the reference information set (RL) ('NO' in S3060), the feature encoding apparatus terminates the above-described process and replaces the reference information identification-marked with unavailability with the closest reference information in the corresponding set (S3090).

According to Embodiment 5 of the present disclosure, when configuring reference information used for prediction, only the information on the current channel shall be used. Additionally, unavailable reference information may be replaced with adjacent available information in the current channel. Accordingly, since prediction can be performed using reference information with similar data distribution characteristics, coding efficiency can be further improved.

Embodiment 6

Embodiment 6 of the present disclosure relates to constraints when configuring reference information for prediction for independent encoding/decoding of coding units. According to Embodiment 6, the reference information used for prediction shall belong to the same channel and the same transmission unit as the current coding unit. Additionally, the reference information shall be encoded/decoded without referencing other channel information, and may be constrained to information to which inter prediction is not applied. The above constraints may be applied at various levels. For example, the above constraints may be applied at the sequence level as shown in FIG. 31a Alternatively, the above constraints may be applied at the channel level as shown in FIG. 31b. Alternatively, the constraints may be applied at the feature level as shown in FIG. 31c.

Figures 31C, 32:
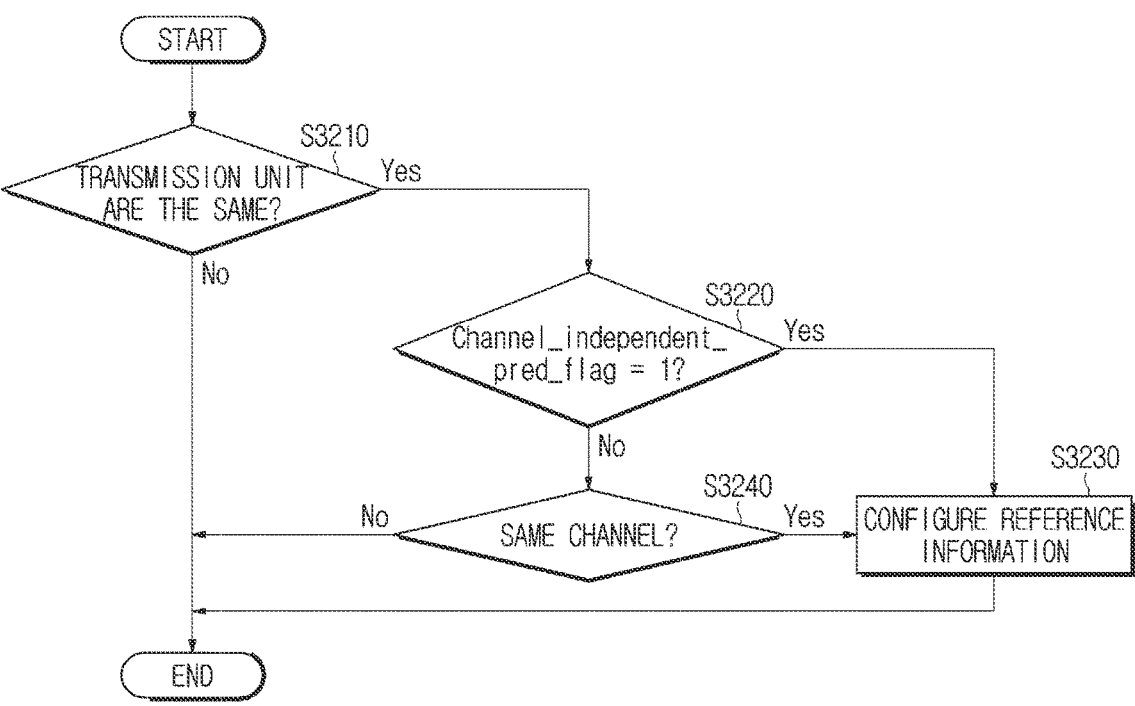
FIG. 32 is a flowchart showing a method of configuring reference information according to an embodiment of the present disclosure.

Meanwhile, in order to control the constraints, the syntaxes according to FIGS. 31a to 31c may include a syntax element channel_independent_pred_flag.

The syntax element channel_independent_pred_flag may specify whether the constraints are applied. For example, channel_independent_pred_flag with a first value (e.g., 1) may specify that only information on the same channel and the same transmission unit is referenced during prediction of the current coding unit. Additionally, if inter prediction is applied or information of another channel or another transmission unit is referenced, the reference information shall not to be used. In contrast, channel_independent_pred_flag with a second value (e.g., 0) may specify that the constraints are not applied.

FIG. 32 is a flowchart showing a method of configuring reference information according to an embodiment of the present disclosure. Each step of FIG. 32 may be performed by the feature encoding apparatus or feature decoding apparatus described above with reference to FIG. 12. Hereinafter, for convenience of explanation, each step of FIG. 32 will be described based on the feature encoding apparatus.

Referring to FIG. 32, the feature encoding apparatus may determine whether a reference information candidate is the same transmission unit (e.g., slice, tile, etc.) as a current coding unit (S3210).

As a result of the determination in step S3210, if the reference information candidate is the same transmission unit as the current coding unit ('YES' in S3210), the feature encoding apparatus may determine whether channel_independent_pred_flag for the reference information has a first value (e.g., 1) (S3220).

As a result of the determination in step S3220, if channel_independent_pred_flag has a first value (e.g., 1), the feature encoding apparatus may configure reference information of the current coding unit using the corresponding reference information candidate (S3230).

As a result of the determination in step S3220, if channel_independent_pred_flag has a second value (e.g., 0), the feature encoding apparatus may determine whether inter prediction is applied to the reference information or whether information in another channel or another transmission unit is referenced (S3240).

As a result of the determination in step S3240, if inter prediction is not applied to the reference information and information in another channel or another transmission unit is not referenced ('YES' in S3240), the feature encoding apparatus configures the reference information of the current coding unit using the corresponding reference information candidate (S3230).

As a result of the determination in step S3240, if inter prediction is applied to the reference information or information in another channel or another transmission unit is referenced ('NO' in S3240), the feature encoding apparatus may determine that the corresponding reference information candidate is not used and terminate the above-described process.

In addition, as a result of the determination in step S3210, if the reference information candidate is not the same transmission unit as the current coding unit ('NO' in S3210), the feature encoding apparatus may determine that the corresponding reference information candidate is not used and terminate the above-described process.

According to Embodiment 6 of the present disclosure, prediction shall be performed using only reference information belonging to the same channel and the same transmission unit. In addition, reference information to which inter prediction is applied or that references information in another channel or another transmission unit shall not to be used for prediction of the current coding unit. Accordingly, independent encoding/decoding of coding units can be guaranteed.

Hereinafter, with reference to FIGS. 33 and 34, a feature encoding/decoding method according to an embodiment of the present disclosure will be described in detail.

Figures 33, 34:
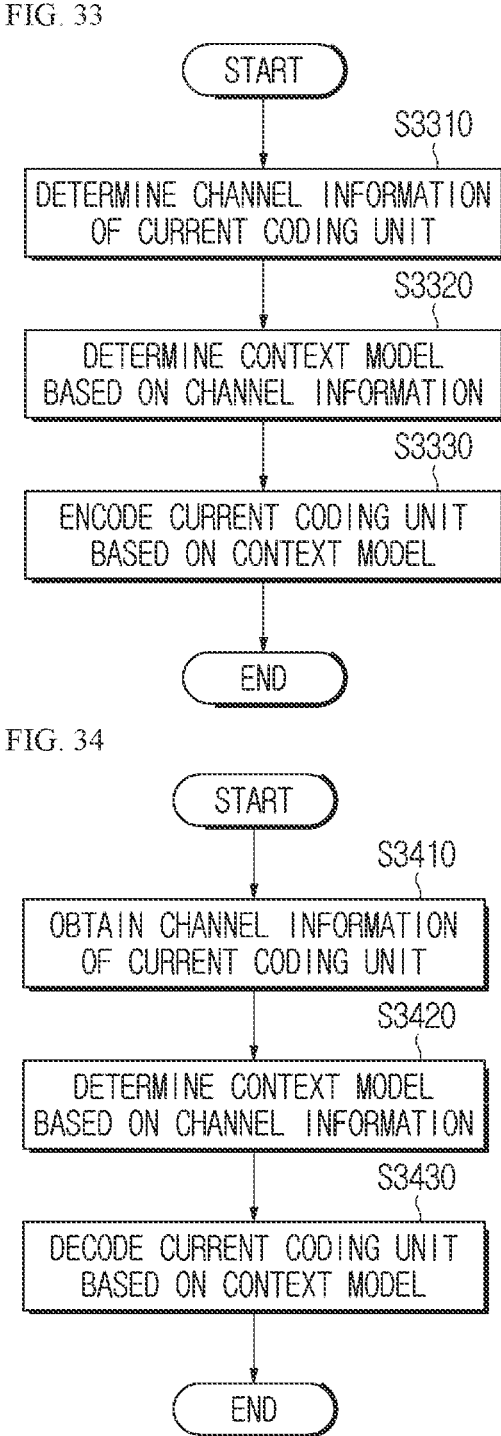
FIG. 33 is a flowchart showing a feature encoding method according to an embodiment of the present disclosure.
FIG. 34 is a flowchart showing a feature decoding method according to an embodiment of the present disclosure.

FIG. 33 is a flowchart showing a feature encoding method according to an embodiment of the present disclosure. The feature information encoding method of FIG. 33 may be performed by the encoding apparatus of FIG. 1.

Referring to FIG. 33, the encoding apparatus may determine channel information of a current coding unit (S3310). In one embodiment, the channel information may include channel grouping information of a feature map including the current coding unit.

The encoding apparatus may determine a context model for the current coding unit based on the channel information (S3320) and encode the current coding unit based on the context model (S3330). In one embodiment, the context model may be determined based on the channel grouping information.

In one embodiment, channels of the feature map are grouped into a plurality of channel groups, and the context model may be individually determined for each of the channel groups.

In one embodiment, based on a pre-stored context model being not present for each of the channel groups, the context model may be obtained through an entropy coding initialization process.

In one embodiment, based on the pre-stored context model being present for each of the channel groups, the context model may be obtained through an entropy coding synchronization process with the pre-stored context model.

In one embodiment, the channel grouping information may include channel group identification information specifying a channel group to which a current channel including the current coding unit belongs.

In one embodiment, the channel group identification information may be obtained based on whether or not the entropy coding synchronization process is performed.

In one embodiment, the current channel including the current coding unit is divided into a plurality of areas, and a different context model may be applied to each of the plurality of areas.

In one embodiment, the context model may be obtained through an entropy coding synchronization process with a context model applied to the same or corresponding position as the current coding unit within a reconstructed channel.

In one embodiment, the feature encoding method described above may further include predicting a current coding unit to be encoded based on predetermined reference information. In this case, the reference information may be constrained to the reconstructed feature information in the current channel including the current coding unit.

FIG. 34 is a flowchart showing a feature decoding method according to an embodiment of the present disclosure. The feature decoding method of FIG. 34 may be performed by the decoding apparatus of FIG. 1.

Referring to FIG. 34, the decoding apparatus may obtain channel information of a current coding unit (S3410). In one embodiment, the channel information may include channel grouping information of a feature map including the current coding unit.

The decoding apparatus may determine a context model for the current coding unit based on the channel information (S3420) and decode the current coding unit based on the context model (S3430). In one embodiment, the context model may be determined based on the channel grouping information.

In one embodiment, channels of the feature map are grouped into a plurality of channel groups, and the context model may be individually determined for each of the channel groups.

In one embodiment, based on a pre-stored context model being not present for each of the channel groups, the context model may be obtained through an entropy coding initialization process.

In one embodiment, based on the pre-stored context model being present for each of the channel groups, the context model may be obtained through an entropy coding synchronization process with the pre-stored context model.

In one embodiment, the channel grouping information may include channel group identification information specifying the channel group to which a current channel including the current coding unit belongs.

In one embodiment, the channel group identification information may be obtained based on whether or not the entropy coding synchronization process is performed.

In one embodiment, the current channel including the current coding unit is divided into a plurality of areas, and a different context model may be applied to each of the plurality of areas.

In one embodiment, the context model may be obtained through an entropy coding synchronization process with a context model applied to the same or corresponding position as the current coding unit within a reconstructed channel.

In one embodiment, the feature encoding method described above may further include predicting a current coding unit to be encoded based on predetermined reference information. In this case, the reference information may be constrained to the reconstructed feature information in the current channel including the current coding unit.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Embodiments described in the present disclosure may be implemented and performed on a processor, microprocessor, controller, or chip. For example, the functional units shown in each drawing may be implemented and performed on a computer, processor, microprocessor, controller, or chip. In this case, information for implementation (e.g., information on instructions) or algorithm may be stored in a digital storage medium.

In addition, the decoder (decoding apparatus) and the encoder (encoding apparatus), to which the embodiment(s) of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, an argument reality (AR) device, a video telephony video device, a transportation terminal (e.g., vehicle (including autonomous vehicle) terminal, robot terminal, airplane terminal, ship terminal, etc.) and a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Additionally, a processing method to which the embodiment(s) of the present disclosure is applied may be produced in the form of a program executed by a computer and stored in a computer-readable recording medium. Multimedia data having a data structure according to the embodiment(s) of this document may also be stored in a computer-readable recording medium. Computer-readable recording media include all types of storage devices and distributed storage devices that store computer-readable data. Computer-readable recording media include, for example, Blu-ray Disc (BD), Universal Serial Bus (USB), ROM, PROM, EPROM, EEPROM, RAM, CD-ROM, magnetic tape, floppy disk, and optical data storage device. Additionally, computer-readable recording media include media implemented in the form of carrier waves (e.g., transmission via the Internet). Additionally, the bitstream generated by the encoding method may be stored in a computer-readable recording medium or transmitted through a wired or wireless communication network.

Additionally, the embodiment(s) of the present disclosure may be implemented as a computer program product by program code, and the program code may be executed on a computer by the embodiment(s) of the present disclosure. The program code may be stored on a carrier readable by a computer.

Figure 35:
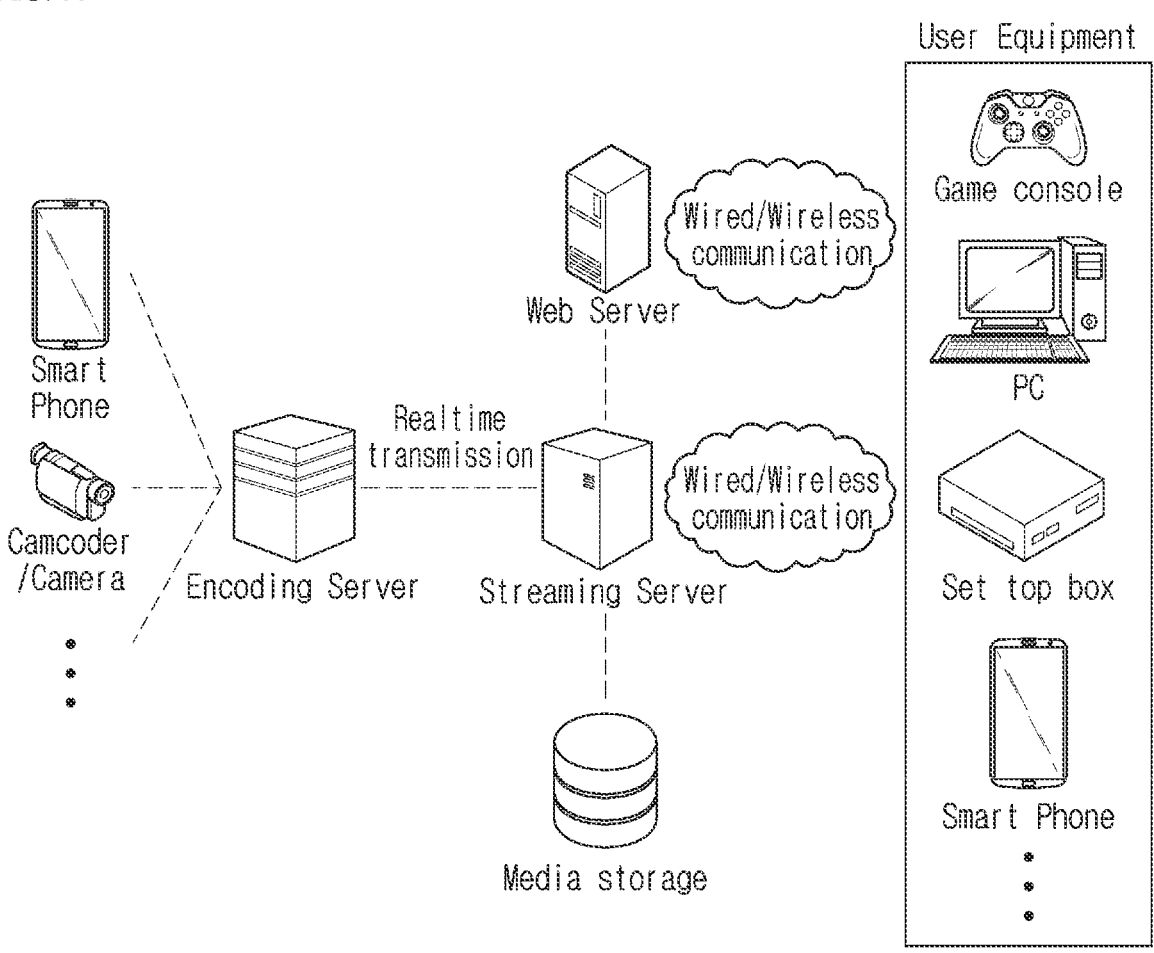
FIG. 35 is a view showing an example of a content streaming system to which embodiments of the present disclosure are applicable.

FIG. 35 is a view illustrating an example of a content streaming system to which embodiments of the present disclosure are applicable.

Referring to FIG. 35, the content streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

Figure 36:
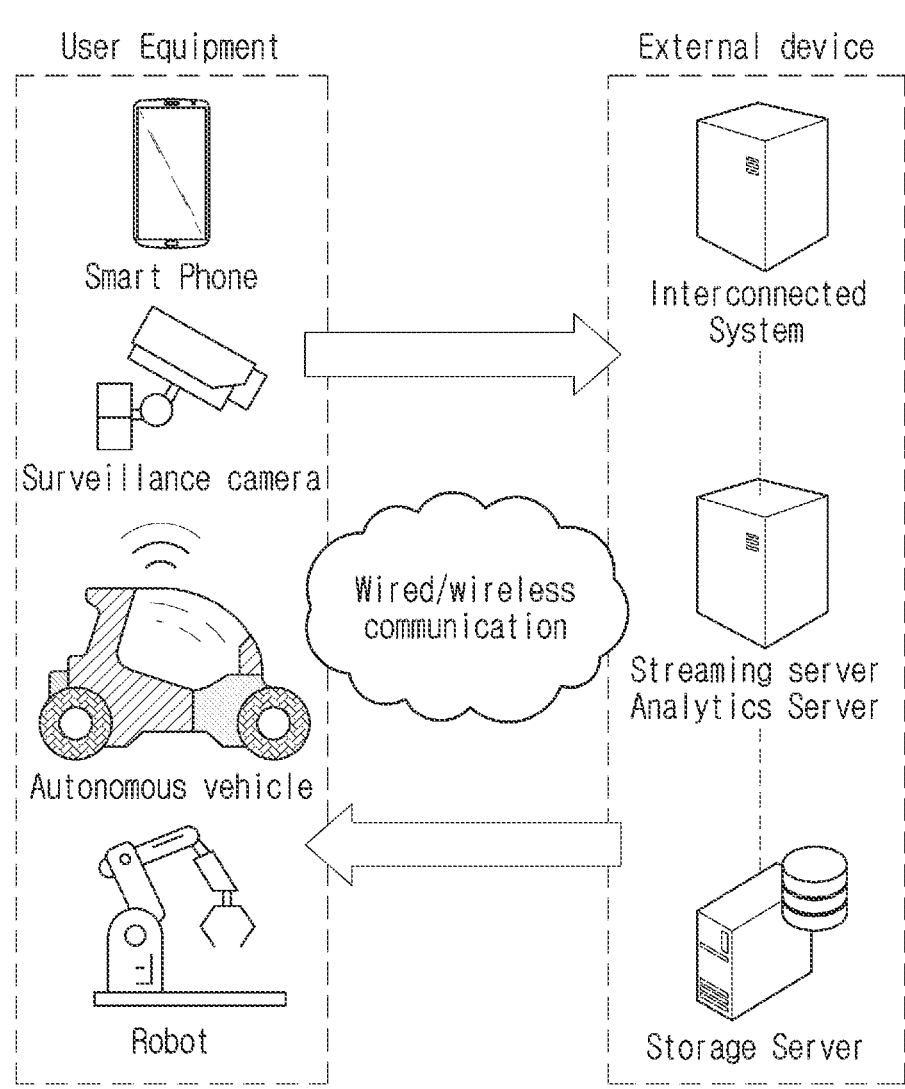
FIG. 36 is a view showing another example of a content streaming system to which embodiments of the present disclosure are applicable.

FIG. 36 is a diagram illustrating another example of a content streaming system to which embodiments of the present disclosure are applicable.

Referring to FIG. 36, in an embodiment such as VCM, a task may be performed in a user terminal or a task may be performed in an external device (e.g., streaming server, analysis server, etc.) according to the performance of the device, the user's request, the characteristics of the task to be performed, etc. In this way, in order to transmit information necessary to perform a task to an external device, the user terminal may generate a bitstream including information necessary to perform the task (e.g., information such as task, neural network and/or usage) directly or through an encoding server.

In an embodiment, the analysis server may perform a task requested by the user terminal after decoding the encoded information received from the user terminal (or from the encoding server). At this time, the analysis server may transmit the result obtained through the task performance back to the user terminal or may transmit it to another linked service server (e.g., web server). For example, the analysis server may transmit a result obtained by performing a task of determining a fire to a fire-related server. In this case, the analysis server may include a separate control server. In this case, the control server may serve to control a command/response between each device associated with the analysis server and the server. In addition, the analysis server may request desired information from a web server based on a task to be performed by the user device and the task information that may be performed. When the analysis server requests a desired service from the web server, the web server transmits it to the analysis server, and the analysis server may transmit data to the user terminal. In this case, the control server of the content streaming system may serve to control a command/response between devices in the streaming system. The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode a feature/feature map.

The invention claimed is:

1. A feature decoding method performed by a feature decoding apparatus, the feature decoding method comprising:

obtaining channel information of a current coding unit;

determining a context model for the current coding unit based on the channel information; and decoding the current coding unit based on the context model, wherein the channel information comprises channel grouping information of a feature map including the current coding unit, wherein the context model is determined based on the channel grouping information, wherein the channel grouping information comprises channel group identification information specifying a channel group to which a current channel including the current coding unit belongs, and wherein the channel group identification information is obtained based on whether to perform an entropy coding synchronization process.

2. The feature decoding method of claim 1, wherein channels of the feature map are grouped into a plurality of channel groups, and wherein the context model is individually determined for each of the channel groups.

3. The feature decoding method of claim 2, wherein the context model is obtained through an entropy coding initialization process based on a pre-stored context model being not present for each of the channel groups.

4. The feature decoding method of claim 2, wherein the context model is obtained through the entropy coding synchronization process with a pre-stored context model, based on the pre-stored context model being present for each of the channel groups.

5. The feature decoding method of claim 1, wherein the current channel including the current coding unit is divided into a plurality of areas, and wherein a different context model is applied to each of the plurality of areas.

6. The feature decoding method of claim 1, wherein the context model is obtained through the entropy coding synchronization process with a context model applied to the same or corresponding position as the current coding unit in a reconstructed channel.

7. The feature decoding method of claim 1, further comprising predicting a current coding unit to be decoded based on predetermined reference information, wherein the reference information is constrained to reconstructed feature information in the current channel including the current coding unit.

8. A feature encoding method performed by a feature encoding apparatus, the feature encoding method comprising:

determining channel information of a current coding unit;

determining a context model for the current coding unit based on the channel information; and encoding the current coding unit based on the context model, wherein the channel information comprises channel grouping information of a feature map including the current coding unit, wherein the context model is determined based on the channel grouping information, wherein the channel grouping information comprises channel group identification information specifying a channel group to which a current channel including the current coding unit belongs, and wherein the channel group identification information is obtained based on whether to perform an entropy coding synchronization process.

9. The feature encoding method of claim 8, wherein channels of the feature map are grouped into a plurality of channel groups, and wherein the context model is individually determined for each of the channel groups.

10. The feature encoding method of claim 9, wherein the context model is obtained through an entropy coding initialization process based on a pre-stored context model being not present for each of the channel groups.

11. The feature encoding method of claim 9, wherein the context model is obtained through the entropy coding synchronization process with a pre-stored context model, based on the pre-stored context model being present for each of the channel groups.

12. The feature encoding method of claim 8, wherein the current channel including the current coding unit is divided into a plurality of areas, and wherein a different context model is applied to each of the plurality of areas.

13. A non-transitory computer-readable recording medium storing instructions that, when executed by a processor, cause the processor to perform the feature encoding method of claim 8.

14. A method of transmitting a bitstream generated by a feature encoding method, the feature encoding method comprising:

determining channel information of a current coding unit;

determining a context model for the current coding unit based on the channel information;

encoding the current coding unit based on the context model to generate the bitstream; and transmitting the bitstream, wherein the channel information comprises channel grouping information of a feature map including the current coding unit, wherein the context model is determined based on the channel grouping information, wherein the channel grouping information comprises channel group identification information specifying a channel group to which a current channel including the current coding unit belongs, and wherein the channel group identification information is obtained based on whether to perform an entropy coding synchronization process.

* * * * *